(12) United States Patent
Suzuki et al.

(10) Patent No.: US 8,331,251 B2
(45) Date of Patent: Dec. 11, 2012

(54) UNAUTHORIZED ACCESS INFORMATION COLLECTION SYSTEM

(75) Inventors: Koei Suzuki, Tokyo (JP); Shunsuke Baba, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 139 days.

(21) Appl. No.: 12/522,653

(22) PCT Filed: Dec. 27, 2007

(86) PCT No.: PCT/JP2007/075213
§ 371 (c)(1),
(2), (4) Date: Jul. 9, 2009

(87) PCT Pub. No.: WO2008/084725
PCT Pub. Date: Jul. 17, 2008

(65) Prior Publication Data
US 2010/0118717 A1   May 13, 2010

(30) Foreign Application Priority Data
Jan. 12, 2007  (JP) ................................. 2007-004038

(51) Int. Cl.
*H04L 12/26* (2006.01)
(52) U.S. Cl. .................. 370/252; 370/395.31; 370/400; 709/228; 709/245
(58) Field of Classification Search .................. 370/252, 370/351–409; 726/22, 23, 11, 25, 12, 14, 726/24; 709/245, 228; 382/313; 340/539.1; 347/230
See application file for complete search history.

(56) References Cited

U.S. PATENT DOCUMENTS

| | | | | |
|---|---|---|---|---|
| 5,805,196 A * | 9/1998 | Nakanishi et al. | ............ | 347/230 |
| 6,128,298 A * | 10/2000 | Wootton et al. | ............... | 370/392 |
| 6,128,664 A * | 10/2000 | Yanagidate et al. | .......... | 709/228 |
| 6,636,516 B1 * | 10/2003 | Yamano | ................... | 370/395.52 |
| 6,892,245 B1 * | 5/2005 | Crump et al. | ................. | 709/245 |
| 7,143,137 B2 * | 11/2006 | Maufer et al. | ................ | 709/205 |
| 7,209,486 B2 * | 4/2007 | Nakahara | ..................... | 370/401 |

(Continued)

FOREIGN PATENT DOCUMENTS
JP    2002-111727 A    4/2002
(Continued)

OTHER PUBLICATIONS

Communication dated Jul. 3, 2012 issued by the State Intellectual Property Office of P.R. China in corresponding Chinese Application No. 200780049754.4.

*Primary Examiner* — Michael Thier
*Assistant Examiner* — Vincelas Louis
(74) *Attorney, Agent, or Firm* — Sughrue Mion, PLLC

(57) ABSTRACT

In an unauthorized access information collection system for monitoring unauthorized access to a honeynet so as to collect unauthorized access information, the system includes: a plurality of honey pots in which a private address or a global address is respectively set and which construct the honeynet; and an unauthorized access information collection device which is disposed between an Internet and the honeynet and which allocates a plurality of global addresses to the private address or the global address by setting of a routing table to transfer a received packet and which performs a communication control from the honeynet side to the Internet side based on a communication control list and records the packets passing through the unauthorized access information collection device.

11 Claims, 23 Drawing Sheets

U.S. PATENT DOCUMENTS

| | | | |
|---|---|---|---|
| 7,360,250 B2 * | 4/2008 | Miyagawa et al. | 726/23 |
| 7,369,563 B2 * | 5/2008 | Choi et al. | 370/401 |
| 7,406,526 B2 * | 7/2008 | Benchetrit et al. | 709/228 |
| 7,464,407 B2 * | 12/2008 | Nakae et al. | 726/22 |
| 7,675,410 B2 * | 3/2010 | Aritsuka et al. | 340/539.1 |
| 7,854,005 B2 * | 12/2010 | Lyle et al. | 726/23 |
| 2003/0065817 A1 | 4/2003 | Benchetrit et al. | |
| 2003/0108055 A1 * | 6/2003 | Damon et al. | 370/401 |
| 2003/0154306 A1 * | 8/2003 | Perry | 709/245 |
| 2003/0225964 A1 * | 12/2003 | Krishnan et al. | 711/108 |
| 2004/0098512 A1 * | 5/2004 | Lin | 709/249 |
| 2004/0136356 A1 * | 7/2004 | Kuo et al. | 370/351 |
| 2006/0083180 A1 * | 4/2006 | Baba et al. | 370/252 |
| 2006/0083248 A1 * | 4/2006 | Huang et al. | 370/395.52 |
| 2007/0101430 A1 * | 5/2007 | Raikar | 726/24 |
| 2007/0165632 A1 * | 7/2007 | Zwiebel | 370/390 |
| 2007/0217413 A1 * | 9/2007 | Margalit et al. | 370/389 |
| 2007/0261112 A1 * | 11/2007 | Todd et al. | 726/11 |
| 2007/0277235 A1 * | 11/2007 | Barrett et al. | 726/12 |
| 2008/0101357 A1 * | 5/2008 | Iovanna et al. | 370/389 |
| 2008/0107360 A1 * | 5/2008 | Yamashita et al. | 382/313 |
| 2009/0241191 A1 * | 9/2009 | Keromytis et al. | 726/23 |
| 2010/0115622 A1 * | 5/2010 | Amoroso et al. | 726/25 |
| 2010/0269172 A1 * | 10/2010 | Xie | 726/14 |

FOREIGN PATENT DOCUMENTS

| | | |
|---|---|---|
| JP | 2002-318739 A | 10/2002 |
| JP | 2003-264595 A | 9/2003 |
| JP | 2004-234401 A | 8/2004 |
| JP | 2004-304752 A | 10/2004 |
| JP | 2006-25354 A | 1/2006 |
| JP | 2006-99590 A | 4/2006 |
| JP | 2006-222662 A | 8/2006 |
| JP | 2006-243878 A | 9/2006 |

* cited by examiner

FIG. 3

| IP ADDRESS (GLOBAL ADDRESS) | PRIVATE ADDRESS |
|---|---|
| 210. 220. 230. 240 | 192. 168. 0. 1 |
| 210. 220. 230. 241 | 192. 168. 0. 2 |
| 210. 220. 230. 242 | 192. 168. 0. 2 |
| 210. 220. 230. 243 | 192. 168. 0. 1 |
| 210. 220. 230. 244 | 192. 168. 0. 2 |

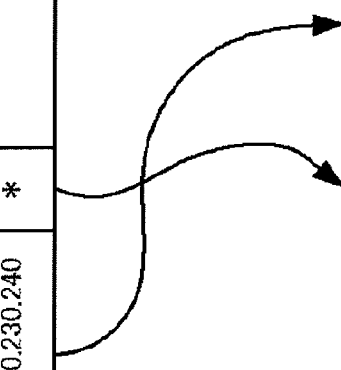

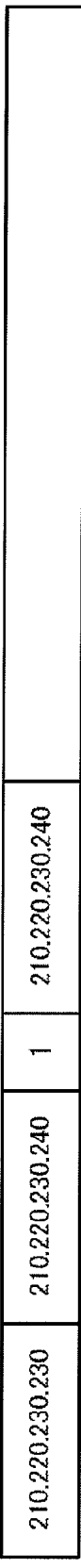
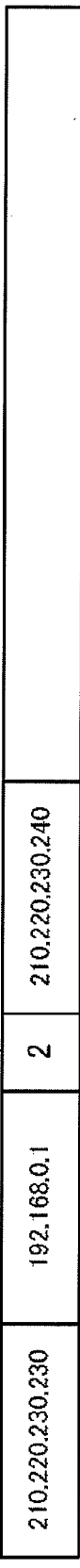

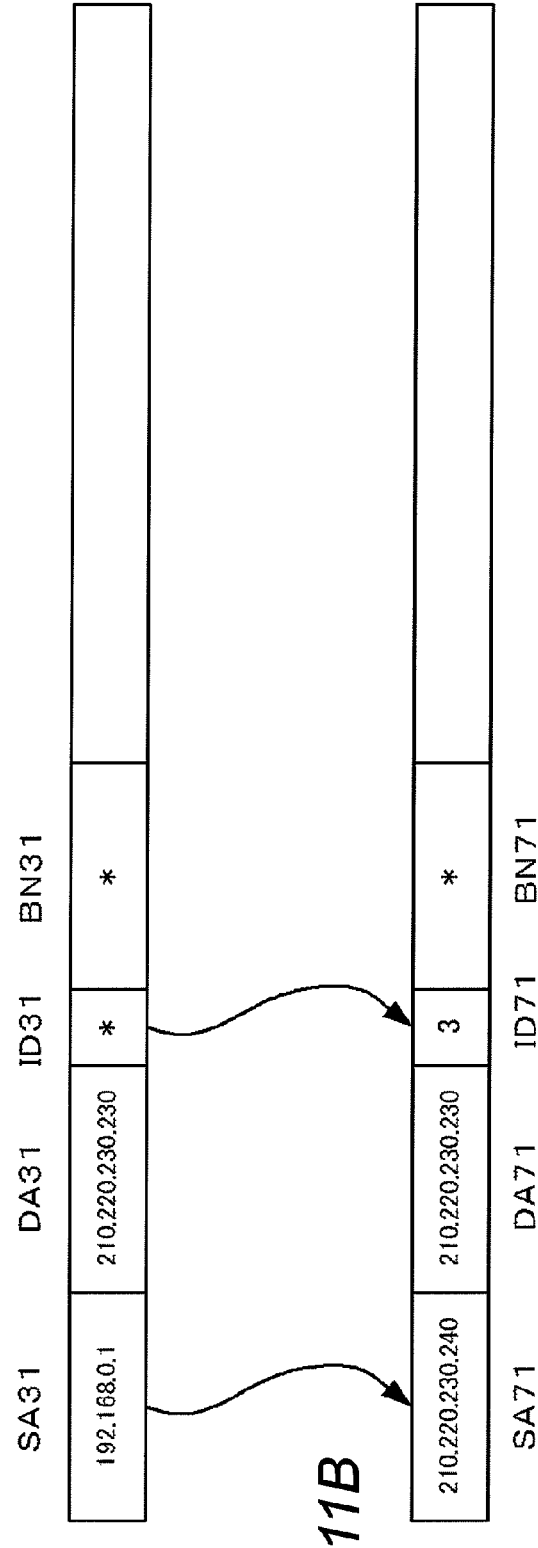

FIG. 23

```
:.[IN ]TCP-NEW- :IN=ppp0 OUT=eth1 SRC=218.168.74.121 DST=192.168.0.2 LEN=48 TOS=0x00 PREC=0x00 TTL=114 ID=7606 DF PROT
Oct 26 13:03:29 localhost kernel: [FWD]INET<==LAN:IN=eth1 OUT=ppp0 SRC=192.168.0.2 DST=218.168.74.121 LEN=48 TOS=0x00 PREC
Oct 26 13:03:29 localhost kernel: [OUT]TCP-R,E- :IN=eth1 OUT=ppp0 SRC=192.168.0.2 DST=218.168.74.121 LEN=48 TOS=0x00 PREC=0
Oct 26 13:03:29 localhost kernel: [FWD]INET==>LAN:IN=ppp0 OUT=eth1 SRC=218.168.74.121 DST=192.168.0.2 LEN=40 TOS=0x00 PREC=0x
Oct 26 13:03:29 localhost kernel: [IN ]TCP-R,E- :IN=ppp0 OUT=eth1 SRC=218.168.74.121 DST=192.168.0.2 LEN=40 TOS=0x00 PREC=0x
Oct 26 13:03:29 localhost kernel: [FWD]INET==>LAN:IN=ppp0 OUT=eth1 SRC=218.168.74.121 DST=192.168.0.2 LEN=40 TOS=0x00 PREC=0x
Oct 26 13:03:29 localhost kernel: [IN ]TCP-R,E- :IN=ppp0 OUT=eth1 SRC=218.168.74.121 DST=192.168.0.2 LEN=40 TOS=0x00 PREC=0x
Oct 26 13:03:29 localhost kernel: [FWD]INET==>LAN:IN=ppp0 OUT=eth1 SRC=218.168.74.121 DST=192.168.0.2 LEN=177 TOS=0x00 PREC=0
Oct 26 13:03:29 localhost kernel: [IN ]TCP-R,E- :IN=ppp0 OUT=eth1 SRC=218.168.74.121 DST=192.168.0.2 LEN=177 TOS=0x00 PRE
Oct 26 13:03:29 localhost kernel: [FWD]INET<==LAN:IN=eth1 OUT=ppp0 SRC=192.168.0.2 DST=218.168.74.121 LEN=129 TOS=0x00 PRE
Oct 26 13:03:29 localhost kernel: [OUT]TCP-R,E- :IN=eth1 OUT=ppp0 SRC=192.168.0.2 DST=218.168.74.121 LEN=129 TOS=0x00 PREC=0
Oct 26 13:03:30 localhost kernel: [FWD]INET==>LAN:IN=ppp0 OUT=eth1 SRC=218.168.74.121 DST=192.168.0.2 LEN=216 TOS=0x00 PREC=0
Oct 26 13:03:30 localhost kernel: [IN ]TCP-R,E- :IN=ppp0 OUT=eth1 SRC=218.168.74.121 DST=192.168.0.2 LEN=216 TOS=0x00 PRE
Oct 26 13:03:30 localhost kernel: [FWD]INET<==LAN:IN=eth1 OUT=ppp0 SRC=192.168.0.2 DST=218.168.74.121 LEN=387 TOS=0x00 PRE
Oct 26 13:03:30 localhost kernel: [OUT]TCP-R,E- :IN=eth1 OUT=ppp0 SRC=192.168.0.2 DST=218.168.74.121 LEN=387 TOS=0x00 PREC=0
Oct 26 13:03:30 localhost kernel: [FWD]INET==>LAN:IN=ppp0 OUT=eth1 SRC=218.168.74.121 DST=192.168.0.2 LEN=362 TOS=0x00 PRE
Oct 26 13:03:30 localhost kernel: [IN ]TCP-R,E- :IN=ppp0 OUT=eth1 SRC=218.168.74.121 DST=192.168.0.2 LEN=362 TOS=0x00 PREC=0
Oct 26 13:03:30 localhost kernel: [FWD]INET<==LAN:IN=eth1 OUT=ppp0 SRC=192.168.0.2 DST=218.168.74.121 LEN=79 TOS=0x00 PREC=0
Oct 26 13:03:30 localhost kernel: [OUT]TCP-R,E- :IN=eth1 OUT=ppp0 SRC=192.168.0.2 DST=218.168.74.121 LEN=79 TOS=0x00 PREC=0x
Oct 26 13:03:30 localhost kernel: [FWD]INET==>LAN:IN=ppp0 OUT=eth1 SRC=218.168.74.121 DST=192.168.0.2 LEN=83 TOS=0x00 PREC=0x
Oct 26 13:03:30 localhost kernel: [IN ]TCP-R,E- :IN=ppp0 OUT=eth1 SRC=218.168.74.121 DST=192.168.0.2 LEN=83 TOS=0x00 PREC=0x
Oct 26 13:03:30 localhost kernel: [FWD]INET<==LAN:IN=eth1 OUT=ppp0 SRC=192.168.0.2 DST=218.168.74.121 LEN=79 TOS=0x00 PREC=0
Oct 26 13:03:31 localhost kernel: [OUT]TCP-R,E- :IN=eth1 OUT=ppp0 SRC=192.168.0.2 DST=218.168.74.121 LEN=79 TOS=0x00 PREC=0x
Oct 26 13:03:31 localhost kernel: [FWD]INET==>LAN:IN=ppp0 OUT=eth1 SRC=218.168.74.121 DST=192.168.0.2 LEN=40 TOS=0x00 PREC=0
Oct 26 13:03:31 localhost kernel: [IN ]TCP-R,E- :IN=ppp0 OUT=eth1 SRC=218.168.74.121 DST=192.168.0.2 LEN=40 TOS=0x00 PREC=0x
Oct 26 13:03:31 localhost kernel: [FWD]INET==>LAN:IN=ppp0 OUT=eth1 SRC=218.168.74.121 DST=192.168.0.2 LEN=40 TOS=0x00 PREC=0x
Oct 26 13:03:31 localhost kernel: [IN ]TCP-R,E- :IN=ppp0 OUT=eth1 SRC=218.168.74.121 DST=192.168.0.2 LEN=40 TOS=0x00 PREC=0x
```

US 8,331,251 B2

UNAUTHORIZED ACCESS INFORMATION COLLECTION SYSTEM

TECHNICAL FIELD

The present invention relates to an unauthorized access information collection system for monitoring unauthorized access to a honeynet constructed of plural honey pots (for example, a decoy server or a decoy network device for decoying a virus or an attacker, etc.) to collect unauthorized access information. More particularly, the present invention relates to an unauthorized access information collection system in which unauthorized access information on wide address space can be collected at low cost and an operation analysis can be easily performed.

BACKGROUND ART

There are the following references as related arts relevant to a conventional unauthorized access information collection system for monitoring unauthorized access to a honeynet constructed of plural honey pots to collect unauthorized access information.
  Patent Reference 1: JP-A-2002-111727
  Patent Reference 2: JP-A-2004-234401
  Patent Reference 3: JP-A-2006-025354
  Patent Reference 4: JP-A-2006-099590
  Patent Reference 5: JP-A-2006-243878

FIG. 17 is a block diagram showing one example of a conventional unauthorized access information collection system. In FIG. 17, numeral 1 is a terminal such as a computer for gaining unauthorized access, and numeral 2 is an unauthorized access information collection device for collecting unauthorized access information, and numerals 3, 4 and 5 are honey pots which are a decoy server or a decoy network device for decoying a virus or an attacker, and numeral 100 is the Internet.

Also, numerals 2, 3, 4 and 5 construct the unauthorized access information collection system, and numerals 3, 4 and 5 construct a honeynet, respectively.

The terminal 1 is mutually connected to the Internet 100 and also one communication unit (for example, a network interface) of the unauthorized access information collection device 2 is mutually connected to the Internet 100. Also, the other communication unit of the unauthorized access information collection device 2 is mutually connected to the honey pots 3, 4 and 5.

Also, FIG. 18 is a block diagram showing a concrete example of the unauthorized access information collection device 2. In FIG. 18, numeral 6 is a communication unit for conducting communication through the Internet 100, and numeral 7 is an arithmetic control unit such as a CPU (Central Processing Unit) for controlling the whole unauthorized access information collection device, and numeral 8 is a communication unit for conducting communication through the honeynet, and numeral 9 is a storage unit such as a hard disk, ROM (Read Only Memory) or RAM (Random Access Memory). Also, numerals 6, 7, 8 and 9 construct an unauthorized access information collection device 50.

The communication unit 6 is mutually connected to the Internet 100 (not shown) and also the input and output are mutually connected to the arithmetic control unit 7. On the other hand, the communication unit 8 is mutually connected to the honeynet (not shown) and also the input and output are mutually connected to the arithmetic control unit 7. Also, input and output of the storage unit 9 are mutually connected to the arithmetic control unit 7.

An action of the conventional example shown in FIG. 17 will be now described with reference to FIGS. 19, 20, 21 and 22. FIG. 19 is a flowchart explaining an action at the time of inbound communication (packet reception from the Internet side) of the arithmetic control unit 7, and FIG. 20 is an explanatory diagram explaining an action at the time of inbound communication, and FIG. 21 is a flowchart explaining an action at the time of outbound communication (packet reception from the honeynet side) of the arithmetic control unit 7, and FIG. 22 is an explanatory diagram explaining an action at the time of outbound communication.

First, a global IP (Internet Protocol) address (hereinafter simply called a global address) is respectively allocated to each of the honey pots 3, 4 and 5 constructing the honeynet. A MAC (Media Access Control address) address and the global address of each of the honey pots 3, 4 and 5 are registered an address table, and the address table is previously stored in the storage unit 9 of the unauthorized access information collection device 50.

Also, limit information about, for example, discard of a packet or transfer to the Internet side of an IP (Internet Protocol) packet (hereinafter simply called a packet) with respect to a destination global address at the time of outbound communication is set a communication control list. The communication control list is previously stored in the storage unit 9 of the unauthorized access information collection device 50.

At the time of inbound communication (packet reception from the Internet side), in "S001" in FIG. 19, the arithmetic control unit 7 decides whether or not a packet is received from the terminal 1 of the Internet side through the communication unit 6. If deciding that the packet is received from the terminal 1 of the Internet side, the arithmetic control unit 7 retrieves whether or not a destination MAC address corresponding to a destination global address is registered in an address table previously stored in the storage unit 9 in "S002" in FIG. 19.

When the arithmetic control unit 7 decides that the MAC address is present in the address list in "S003" in FIG. 19, the arithmetic control unit 7 records information about the received packet in a log file of the storage unit 9 in "S004" in FIG. 19 and also the arithmetic control unit 7 transfers the received packet to a honey pot corresponding to the MAC address in the honeynet side through the communication unit 8 in "S005" in FIG. 19.

For example, when receiving a packet whose destination global address is "IP01", from the terminal 1 located at the side of the Internet 100 as shown by "PC01" in FIG. 20, the unauthorized access information collection device 2 retrieves an address list. Then, when a MAC address "MC01" corresponding to the destination global address "IP01" is present the unauthorized access information collection device 2, the unauthorized access information collection device 2 records the packet information in a log file in a text format and also transfers the received packet to the honey pot 3 whose MAC address is "MC01".

On the other hand, in the case of deciding that the MAC address is not present in the address list in "S003" in FIG. 19, in other words, in the case where a honey pot whose MAC address is to be transferred is not present, the arithmetic control unit 7 discards the received packet in "S006" in FIG. 19.

For example, when receiving a packet whose destination global address is "IP05", from the terminal 1 located at the side of the Internet 100 as shown by "PC02" in FIG. 20, the unauthorized access information collection device 2 retrieves an address list. Then, when a MAC address corresponding to the destination global address "IP05" is not present, in other words, a honey pot whose MAC address is to be transferred is not present, the unauthorized access information collection device 2 discards the received packet.

Also, at the time of outbound communication (packet reception from the honeynet side), in "S101" in FIG. 21, the arithmetic control unit 7 decides whether or not a packet is received from a certain honey pot located at the honeynet side through the communication unit 8. Then, in the case of deciding that the packet is received from the certain honey pot located at the honeynet side, the arithmetic control unit 7 retrieves whether or not limit information about a destination private address is registered in the communication control list in "S102" in FIG. 21.

When the arithmetic control unit 7 decides that the limit information about the destination private address is not present in the communication control list in "S103" in FIG. 21, the arithmetic control unit 7 records information about the received packet in a log file of the storage unit 9 in "S104" in FIG. 21 and also the arithmetic control unit 7 transfers the received packet to a terminal corresponding to a destination global address located at the Internet side through the communication unit 6 in "S105" in FIG. 21.

For example, when receiving a packet whose private address of the honey pot 3 of the honeynet side is "IP11" as shown by "PC11" in FIG. 22, the unauthorized access information collection device 2 retrieves the communication control. Then when limit information corresponding to a destination private address "IP21" is not present, the unauthorized access information collection device 2 records information about the packet in a log file in a text format and also transfers the received packet to the terminal 1 whose destination global address is "IP11".

On the other hand, in the case of deciding that the limit information is present in the communication control list in "S103" in FIG. 21, in other words, in the case of limiting sending of the destination private address, the arithmetic control unit 7 discards the received packet in "S106" in FIG. 21.

For example, when receiving a packet whose private address of the honey pot 5 of the honeynet side is "IP12" as shown by "PC12" in FIG. 22, the unauthorized access information collection device 2 retrieves the communication control. Then, when limit information corresponding to a destination private address "IP12" is present, in other words, sending from a destination private address is limited, the unauthorized access information collection device 2 discards the received packet.

With such an action, packet information passing through the unauthorized access information collection device 50 is recorded in a log file of the storage unit 9, so that unauthorized access to a honeynet of an attacker or a virus can be grasped by analyzing the log file.

Also, since the unauthorized access information collection device 50 performs communication control of a packet from the honeynet side to the Internet side based on the preset communication control list, for example, it is possible to prevent a honey pot to which unauthorized access is made from being used as the ladder for an attack on other networks.

As a result of this, since an unauthorized access information collection device is provided between the Internet and the honeynet, packet information passing through the unauthorized access information collection device is recorded and communication control from the honeynet side to the Internet side is performed based on a set communication control list, it is possible to collect unauthorized access information and also it is possible to prevent a honey pot to which unauthorized access is made from being used as the ladder for an attack on other networks.

DISCLOSURE OF THE INVENTION

Problems That the Invention is to Solve

However, in the conventional example shown in FIG. 17, the global address is allocated to each of the honey pots constructing the honeynet one by one, so that in the case of collecting unauthorized access information on wide address space, it is necessary to prepare a large number of honey pots (a network device, a server, etc.) and there has been a problem in that operational cost increases.

Also, FIG. 23 is an explanatory diagram showing one example of packet information recorded in a log file, and in the packet information as shown in FIG. 23, it is necessary to read a log by one line and analyze an action. Thus, there has been a problem in that it is difficult to grasp a situation of unauthorized access (operating analyze) in real time.

Therefore, the problems that the invention is to solve are to achieve an unauthorized access information collection system in which unauthorized access information can be collected in wide address space at low cost and operating analysis can be easily performed.

Means for Solving the Problems

In order to achieve the above problems, according to a first aspect of the invention, in an unauthorized access information collection system for monitoring unauthorized access to a honeynet so as to collect unauthorized access information, the system comprises: a plurality of honey pots in which a private address or a global address is respectively set and which construct the honeynet; and an unauthorized access information collection device which is disposed between an Internet and the honeynet and which allocates a plurality of global addresses to the private address or the global address by setting of a routing table to transfer a received packet and which performs a communication control from the honeynet side to the Internet side based on a communication control list and records the packets passing through the unauthorized access information collection device. Therefore, unauthorized access information can be collected in a wide address space at low cost and, for example, it is possible to prevent a honey pot to which unauthorized access is made from being used as the ladder for an attack on other networks.

According to a second aspect of the invention, the unauthorized access information collection device comprises: a first communication unit for conducting a communication through the Internet; a second communication unit for conducting a communication through the honeynet; a storage unit which stores the routing table; and an arithmetic control unit which controls the entire device and records a packet received through the first communication unit in the storage unit and which writes a first detection point identifier, a destination global address and a destination port number into the recorded packet and which, if the destination global address is present in the routing table, rewrites a destination address of the received packet into the private address or the global address and which rewrites a destination address of the previously recorded packet into the private address or the global address and writes a second detection point identifier and stores the second detection point identifier in the storage unit and which transfers the received packet rewritten into the private address or the global address through the second communication unit and which discards the received packet when the destination global address is not present in the routing table. Therefore, unauthorized access information can be collected in a wide address space at low cost and, for example, it is possible to prevent a honey pot to which unauthorized access is made from being used as the ladder for an attack on other networks.

According to a third aspect of the invention, the unauthorized access information collection device comprises: a first communication unit for conducting a communication through the Internet; a second communication unit for conducting a communication through the honeynet; a storage unit which stores the communication control list; and an arithmetic control unit which controls the entire device and which, if limit information about a source global address or a source private address of a packet received through the second communication unit is not registered in the communication control list, records the received packet in the storage unit and writes a third detection point identifier into the recorded packet and which rewrites a source address of the received packet into a global address and transfers the global address through the first communication unit and which, if the limit information is present in the communication control list, records the received packet in the storage unit, writes a fourth detection point identifier into the recorded packet and discards the received packet. Therefore, unauthorized access information can be collected in a wide address space at low cost and, for example, it is possible to prevent a honey pot to which unauthorized access is made from being used as the ladder for an attack on other networks.

According to a fourth aspect of the invention, the arithmetic control unit: displays an Internet plane, an device plane and a honeynet plane which use an IP address and a port number as each of coordinate axes on a display unit and reads a recorded packet out of the storage unit; makes a drawing between the Internet plane and the device plane when the first detection point identifier is written; makes a drawing between the device plane and the honeynet plane when the second detection point identifier is written; makes a drawing between the honeynet plane and the Internet plane when the third detection point identifier is written; and makes a drawing between the honeynet plane and the device plane when the fourth detection point identifier is written. Therefore, a communication situation between the respective devices can be displayed in three dimensions, so that operation analysis can e easily performed.

According to a fifth aspect of the invention, when the first detection point identifier is written, the arithmetic control unit displays a source address in coordinates of the Internet plane and displays the destination address in coordinates of the device plane and makes a drawing such that two points are connected to each other with a line segment. Therefore, a communication situation between the respective devices can be displayed in three dimensions, so that operation analysis can e easily performed.

According to a sixth aspect of the invention, when the second detection point identifier is written, the arithmetic control unit displays a destination global address before rewriting in coordinates of the device plane and displays the rewritten private address or the rewritten global address in coordinates of the honeynet plane and makes a drawing such that two points are connected to each other with a line segment. Therefore, a communication situation between the respective devices can be displayed in three dimensions, so that operation analysis can e easily performed.

According to a seventh aspect of the invention, when the third detection point identifier is written, the arithmetic control unit displays a source address in coordinates of the honeynet plane and displays a destination address in coordinates of the Internet plane and makes a drawing such that two points are connected to each other with a line segment. Therefore, a communication situation between the respective devices can be displayed in three dimensions, so that operation analysis can e easily performed.

According to an eighth aspect of the invention, when the fourth detection point identifier is written, the arithmetic control unit displays a source address in coordinates of the honeynet plane and displays a destination address in coordinates of the device plane and makes a drawing such that two points are connected to each other with a line segment. Therefore, a communication situation between the respective devices can be displayed in three dimensions, so that operation analysis can e easily performed.

According to a ninth aspect of the invention, the arithmetic control unit performs a color coding display on the line segment. Therefore, a protocol type of a packet passing through the respective devices can be intuitively separated and observed with color, so that operation analysis can be performed more easily.

According to a tenth aspect of the invention, the arithmetic control unit moves a marker toward a packet propagation direction such that the marker traces the line segment. Therefore, it is possible to intuitively grasp the packet propagation direction.

According to a eleventh aspect of the invention, the arithmetic control unit displays the marker in any shape. Therefore, it is possible to intuitively grasp the packet propagation direction.

According to a twelfth aspect of the invention, the arithmetic control unit sets luminance of the marker such that luminance of the marker is different from ambient luminance. Therefore, it is possible to intuitively grasp the packet propagation direction.

Advantage of the Invention

There are the following advantages in the present invention.

According to the first to third aspects of the invention, an unauthorized access information collection device is disposed between the Internet and the honeynet and also the private address is allocated to each of the honey pots constructing the honeynet and the plurality of global addresses are allocated to the private address by setting of a routing table and a received packet is transferred and the packet into which a detection point identifier is written is recorded and communication control from the honeynet side to the Internet side is performed based on the set communication control list. Therefore, unauthorized access information can be collected in wide address space at low cost and, for example, it is possible to prevent the honey pot to which unauthorized access is made from being used as the ladder for an attack on other networks.

Also, according the fourth to eighth aspects of to the invention, based on a recorded packet to which a detection point identifier are added, the arithmetic control unit makes a drawings between the Internet plane and the device plane with a line segment, makes a drawing between the device plane and a honeynet plane with a line segment or makes a drawing between the Internet plane and the honeynet plane with a line segment. Therefore, a communication situation between the respective devices can be displayed in three dimensions, so that operation analysis can be performed easily.

Also, according to the ninth aspect of the invention, the arithmetic control unit performs color coding display on the line segment. Therefore, a protocol type of a packet passing through the respective devices can be intuitively separated and observed by color, so that operation analysis can be performed more easily.

Also, according to the tenth to twelfth aspects of the invention, the arithmetic control unit moves a marker toward the packet propagation direction such that the marker traces the line segment. Therefore, the marker moves toward the packet propagation direction such that the marker traces the line segment, so that packet the propagation direction can be grasped intuitively.

BRIEF DESCRIPTION OF THE DRAWINGS

FIG. 3 is an explanatory diagram explaining allocation of global addresses.

FIG. 7 is an explanatory diagram explaining one example of a recorded packet.

FIG. 8 is an explanatory diagram explaining one example of a recorded packet.

FIGS. 11A and 11B are explanatory diagrams explaining one example of a recorded packet.

FIG. 23 is an explanatory diagram showing one example of information about a packet recorded in a log file.

DESCRIPTION OF REFERENCE NUMERALS AND SIGNS

1 TERMINAL
2,10,50,51 UNAUTHORIZED ACCESS INFORMATION COLLECTION DEVICE
3,4,5,11,12,13 HONEY POT
6,8,15,17 COMMUNICATION UNIT
7,16 ARITHMETIC CONTROL UNIT
9,18 STORAGE UNIT
14 MANAGEMENT TERMINAL
19 DISPLAY UNIT
100 INTERNET

BEST MODE FOR CARRYING OUT THE INVENTION

Figure 1:
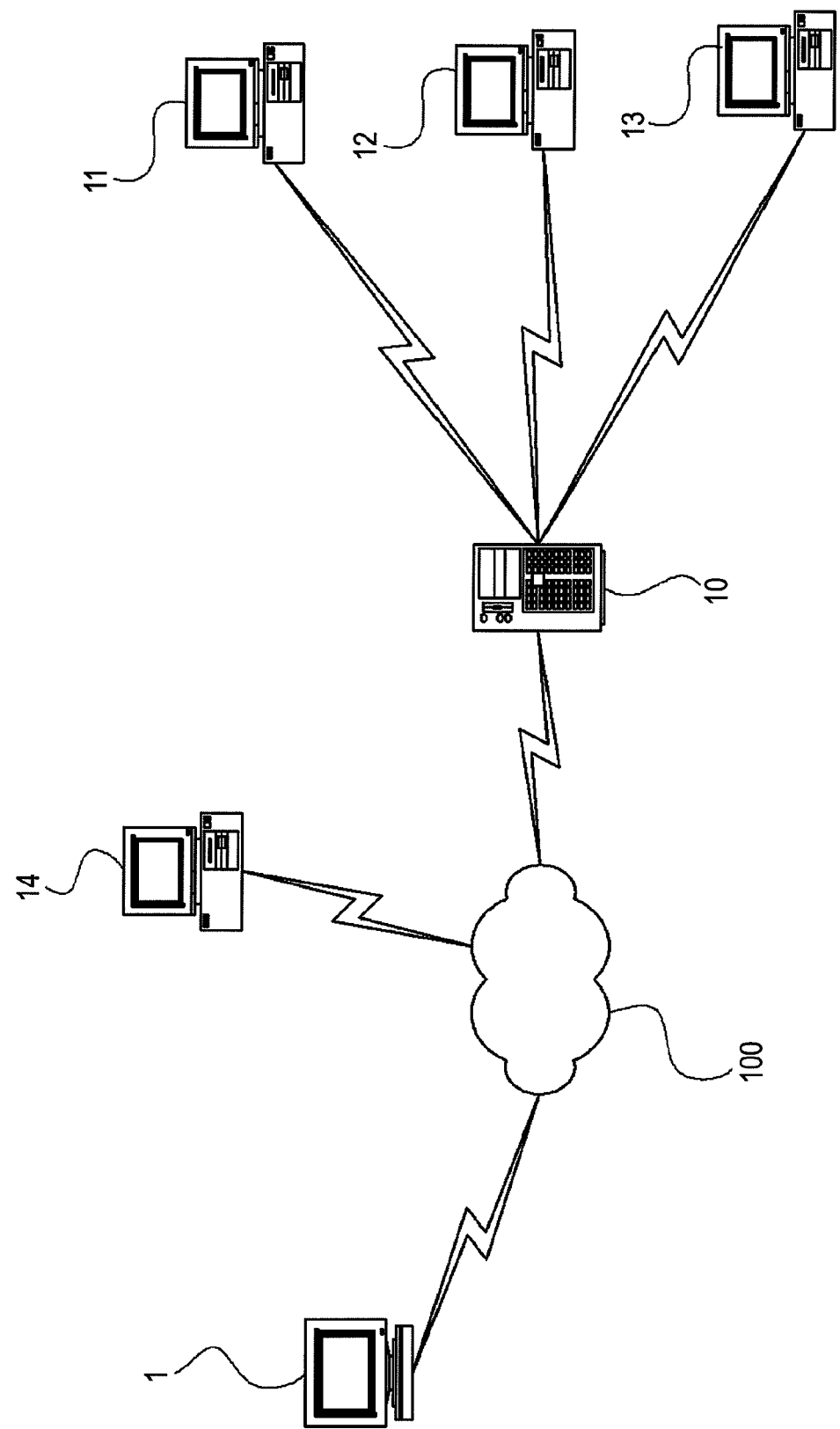
FIG. 1 is a block diagram showing one embodiment of an unauthorized access information collection system according to the invention.

The invention will be now described in detail with reference to the drawings. FIG. 1 is a block diagram showing one embodiment of an unauthorized access information collection system according to the invention.

In FIG. 1, the same numerals as those of FIG. 16 are assigned to numerals 1 and 100, and numeral 10 is an unauthorized access information collection device for collecting unauthorized access information, and numerals 11, 12 and 13 are honey pots which are a decoy server or a decoy network device for decoying a virus or an attacker, and numeral 14 is a management terminal for managing the unauthorized access information collection device via the Internet.

Also, numerals 10, 11, 12 and 13 construct the unauthorized access information collection system, and numerals 11, 12 and 13 construct a honeynet, respectively.

The terminal 1 is mutually connected to the Internet 100, and also one communication unit (for example, a network interface) of the unauthorized access information collection device 10 is mutually connected to the Internet 100. Also, the other communication unit of the unauthorized access information collection device 10 is mutually connected to the honey pots 11, 12 and 13. Further, the management terminal 14 is mutually connected to the Internet 100.

Figure 2:
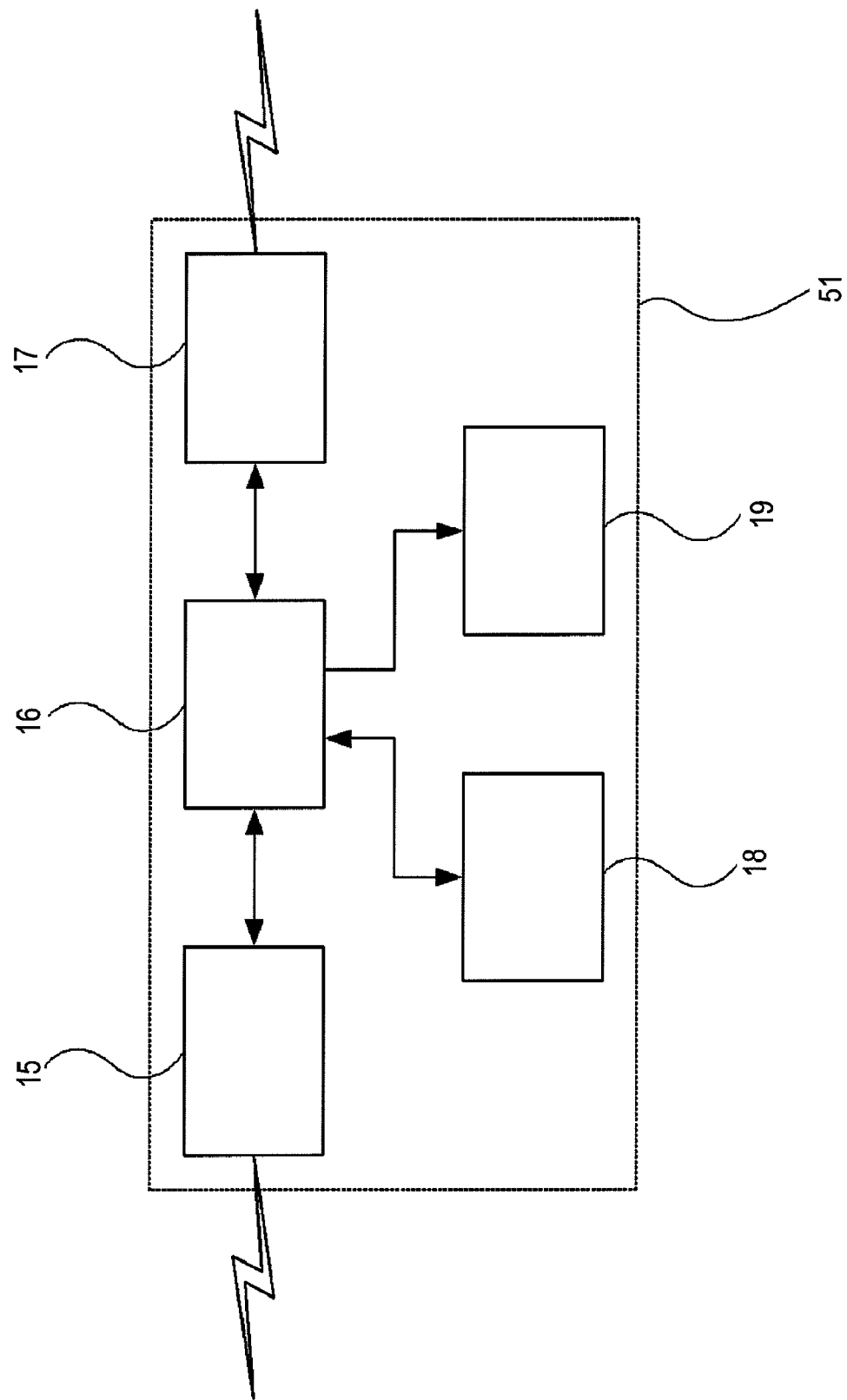
FIG. 2 is a block diagram showing a concrete example of an unauthorized access information collection device.

Also, FIG. 2 is a block diagram showing a concrete example of the unauthorized access information collection device 10. In FIG. 2, numeral 15 is a communication unit for conducting communication through the Internet 100, and numeral 16 is an arithmetic control unit such as a CPU for controlling the whole unauthorized access information collection device 10, and numeral 17 is a communication unit for conducting communication through the honeynet, and numeral 18 is a storage unit such as a hard disk, ROM or RAM, and numeral 19 is a display unit such as a CRT (Cathode Ray Tube) or an LCD (Liquid Crystal Display). Also, numerals 15, 16, 17, 18 and 19 construct an unauthorized access information collection device 51.

The communication unit 15 is mutually connected to the Internet 100 (not shown), and also the input and output are mutually connected to the arithmetic control unit 16. On the other hand, the communication unit 17 is mutually connected to the honeynet (not shown), and also the input and output are mutually connected to the arithmetic control unit 16. Also, input and output of the storage unit 18 are mutually connected to the arithmetic control unit 16 and a display output of the arithmetic control unit 16 is connected to the display unit 19.

An action of the embodiment shown in FIG. 1 will be now described with reference to FIGS. 3, 4, 5, 6, 7, 8, 9, 10, 11 and 12.

Figure 4:
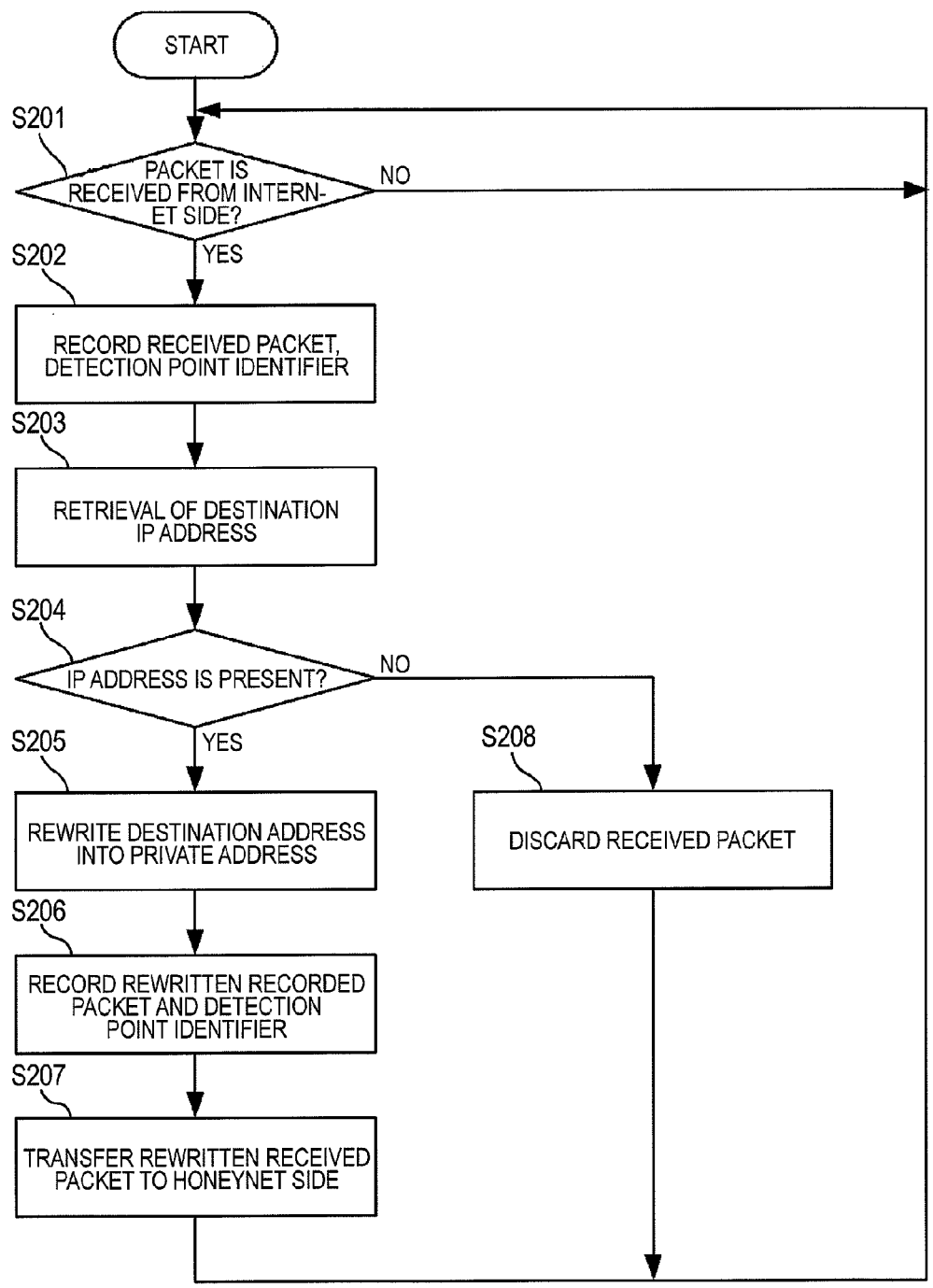
FIG. 4 is a flowchart explaining an action of an arithmetic control unit at the time of inbound communication.
Figure 5:
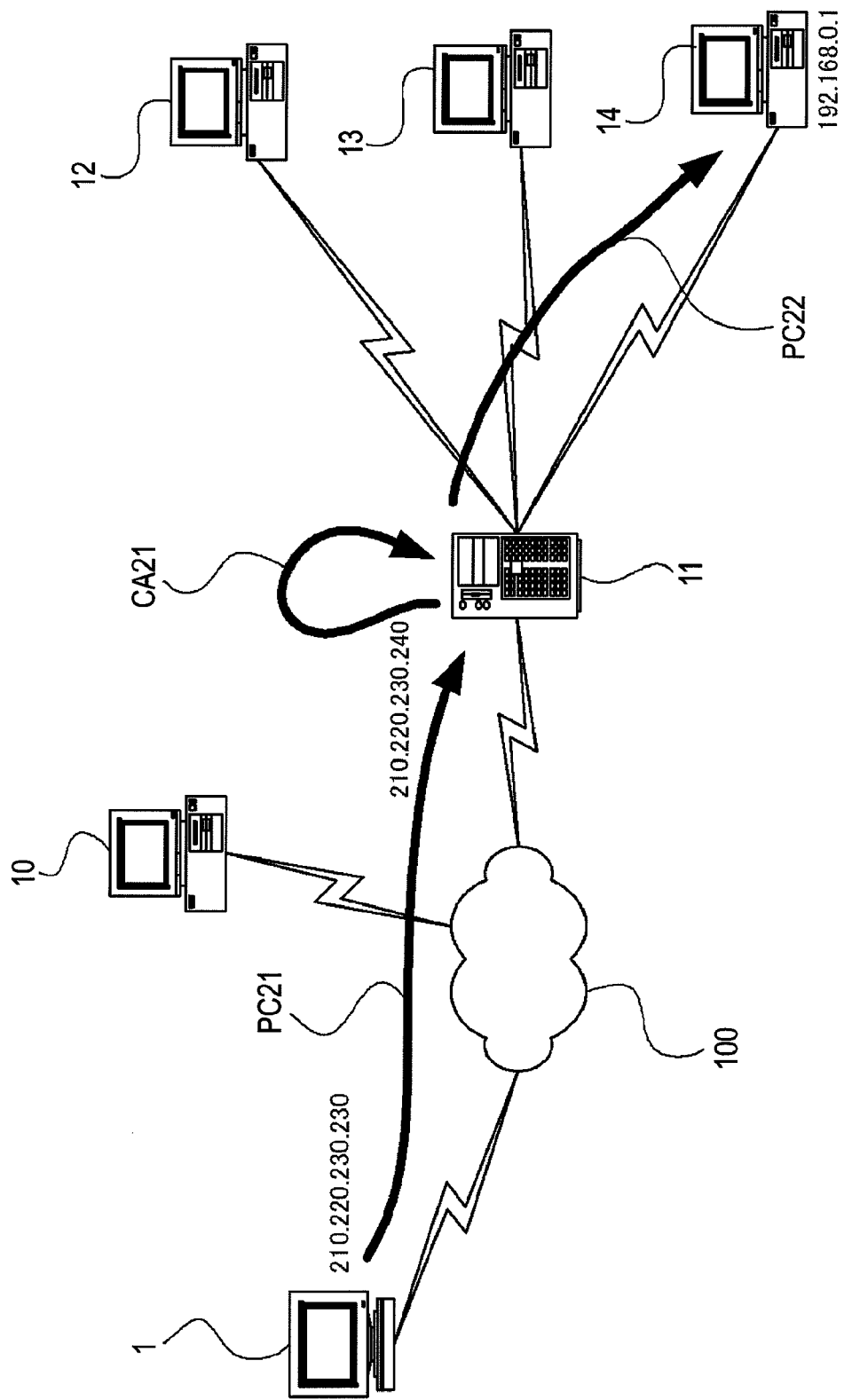
FIG. 5 is an explanatory diagram explaining an action at the time of inbound communication.
Figure 6:
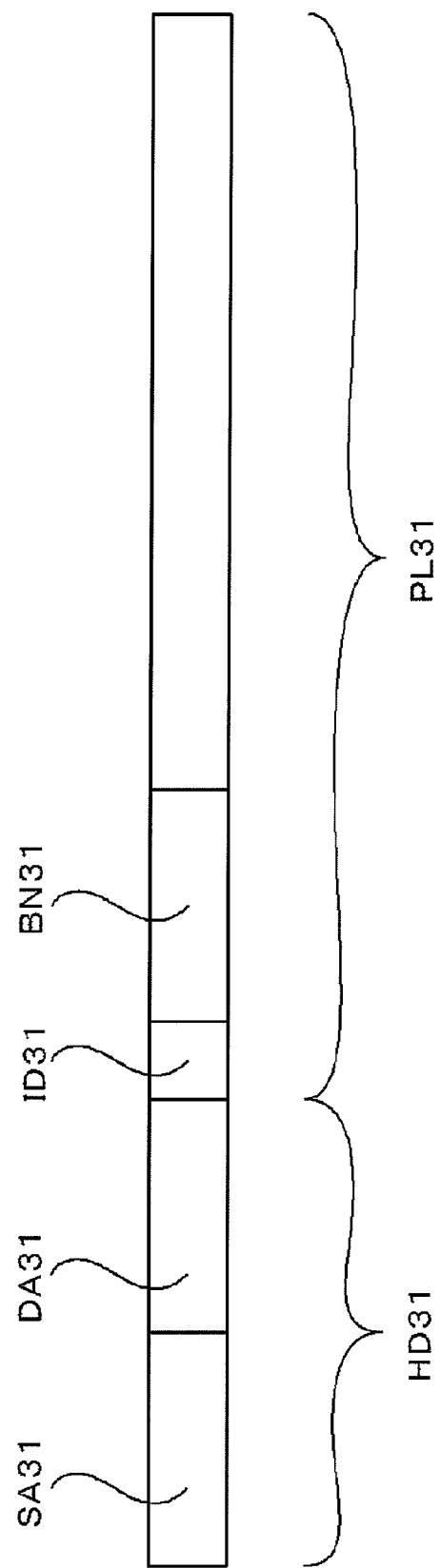
FIG. 6 is an explanatory diagram explaining a configuration of a recorded packet.
Figure 9:
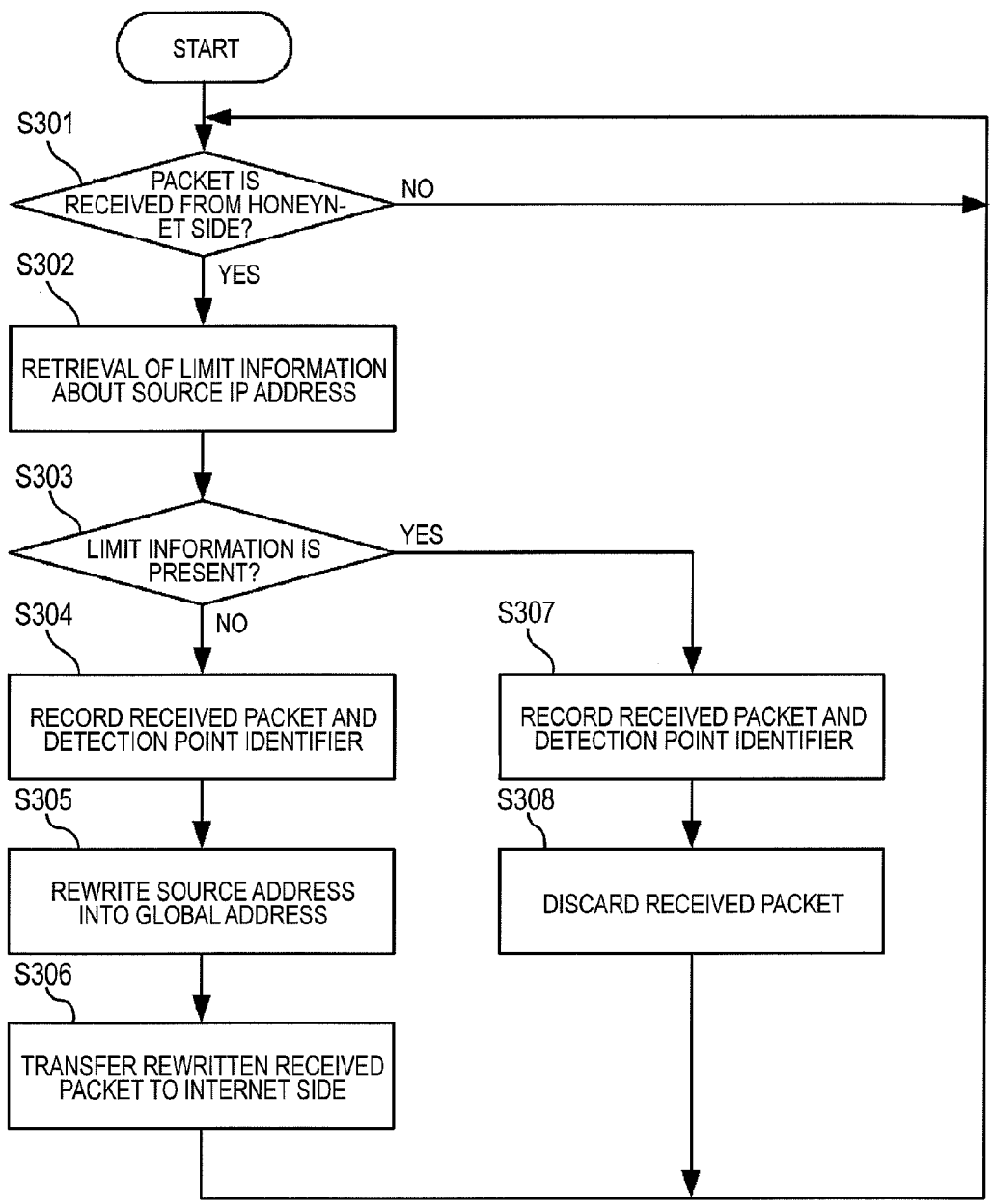
FIG. 9 is a flowchart explaining an action at the time of outbound communication of the arithmetic control unit.
Figure 10:
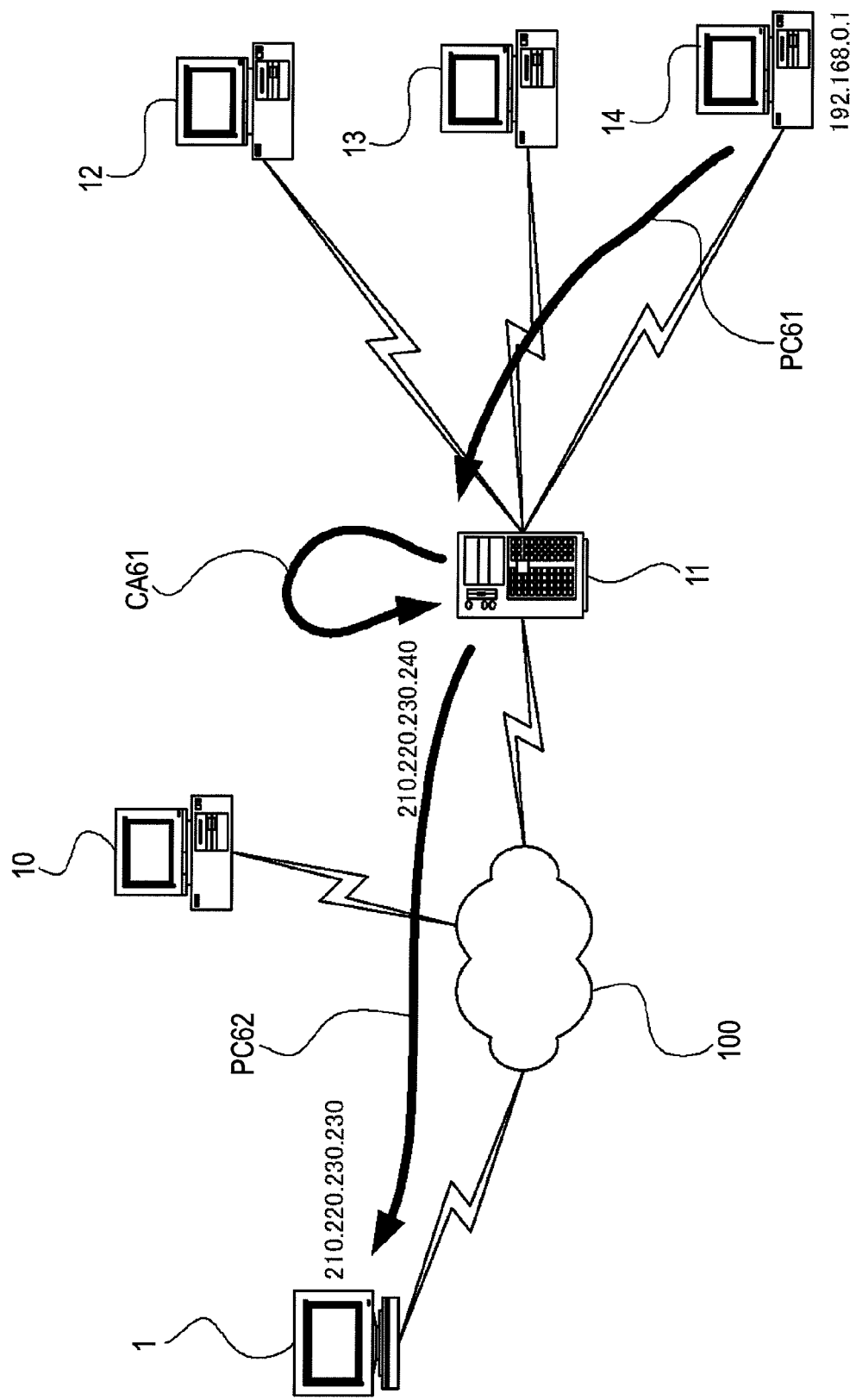
FIG. 10 is an explanatory diagram explaining an action at the time of outbound communication.

FIG. 3 is an explanatory diagram explaining allocation of global addresses, and FIG. 4 is a flowchart explaining an action at the time of inbound communication (a packet reception from the Internet side) of the arithmetic control unit 16, and FIG. 5 is an explanatory diagram explaining an action at the time of inbound communication, and FIG. 6 is an explanatory diagram explaining a configuration of a recorded packet, and FIGS. 7, 8, 11A, 11B, 12A and 12B are explanatory diagrams explaining one example of a recorded packet, and FIG. 9 is a flowchart explaining an action at the time of outbound communication (packet reception from the honeynet side) of the arithmetic control unit 16, and FIG. 10 is an explanatory diagram explaining an action at the time of outbound communication.

First, a private IP (Internet Protocol) address (hereinafter simply called a private address) is respectively allocated to each of the honey pots 11, 12 and 13 constructing the honeynet, and a relation between private addresses of each of the honey pots 11, 12 and 13 and global addresses allocated to the private addresses is registered in a routing table. The routing table is previously stored in the storage unit 18 of the unauthorized access information collection device 51.

FIG. 3 shows one example of such a routing table and, for example, global addresses "210.220.230.240" and "210.220.230.243" are allocated to a private address "192.168.0.1".

Also, for example, global addresses "210.220.230.241", "210.220.230.242" and "210.220.230.244" are allocated to a private address "192.168.0.2".

Further, limit information about, for example, discard of a packet or transfer to the Internet side of a packet with respect to a destination global address at the time of outbound communication is set in a communication control list, The communication control list is previously stored in the storage unit 18 of the unauthorized access information collection device 51.

At the time of inbound communication (packet reception from the Internet side), the arithmetic control unit 16 decides whether or not a packet is received from the terminal 1 of the Internet side through the communication unit 15 in "S201" in FIG. 4.

For example, it is assumed that a packet shown by "PC21" in FIG. 5 and whose destination global address is "210.220.230.240" is sent from the terminal 1 whose global address is "210.220.230.230" to an unauthorized access information collection device 11. Also, at this time, a private address of a honey pot 14 shall be "192.168.0.1".

In the case of deciding that the packet is received from the terminal 1 of the Internet side through the communication unit 15 in "S201" in FIG. 4, the arithmetic control unit 16 records the received packet in the storage unit 18 and also writes a destination port number, a destination global address and a detection point identifier into a payload of the recorded packet in "S202" in FIG. 4.

For example, in the packet recorded in the storage unit 18, a source address and a destination address are stored in the portions shown by "SA31" and "DA31" in FIG. 6 of a header portion shown by "HD31" in FIG. 6, and the detection point identifier is written into the portion shown by "ID31" in FIG. 6 of a payload portion shown by "PL31" in FIG. 6, and the destination global address and the destination port number (described in the payload portion of the packet) are written into the portion shown by "BN31" in FIG. 6.

That is, information as shown in FIG. 7A is written into a packet whose destination global address is "210.220.230.240" and which is received from the terminal 1 whose global address is "210.220.230.230". In step "S202" in FIG. 4, the arithmetic control unit 16 writes information as shown in FIG. 7B into the payload portion and records the information in the storage unit 18.

For example, "1" is written into the portion shown by "ID41" in FIG. 7B as a detection point identifier, and a global address stored in the portion shown by "DA31" in FIG. 7A is written into the portion shown by "BN41" in FIG. 7B.

Incidentally, the detection point identifier "1" indicates a point when a packet is received from the Internet side.

Next, the arithmetic control unit 16 retrieves whether or not a destination global address is registered in a routing table previously stored in the storage unit 9 in "S203" in FIG. 4.

When the arithmetic control unit 16 decides that the global address is present in a routing list in "S204" in FIG. 4, the arithmetic control unit 16 rewrites a destination address of the received packet into a private address based on the routing table shown in FIG. 3 in "S205" in FIG. 4.

Also, the arithmetic control unit 16 rewrites a destination address of the packet recorded in step "S202" in FIG. 4 into a private address based on the routing table shown in FIG. 3. Then, the arithmetic control unit 16 records the packet in the storage unit 18 and also writes a detection point identifier into a payload of the recorded packet in "S206" in FIG. 4.

That is, information as shown in FIG. 8A is written into a packet recorded in step "S202" in FIG. 4. Through the step "S206" in FIG. 4, the arithmetic control unit 16 writes information as shown in FIG. 8B into a header portion and a payload portion and records the information in the storage unit 18.

For example, the portion shown by "DA51" in FIG. 8 is rewritten into a private address "192.168.0.1" based on the routing table, and "2" is written into the portion shown by "ID51" in FIG. 8 as a detection point identifier.

Incidentally, the detection point identifier "2" indicates a point when the portion shown by "DA51" is rewritten into the private address.

The arithmetic control unit 16 transfers the received packet rewritten into a private address, based on the routing table, to a honey pot having the private address of the honeynet side through the communication unit 15 in "S207" in FIG. 4.

For example, the received packet is rewritten into a private address as shown by "CA21" in FIG. 5 and is transferred to the honey pot 14 as shown by "PC22" in FIG. 5.

On the other hand, in the case of deciding that the destination global address is not present in the routing list in "S204" in FIG. 4, in other words, a honey pot having the global address (private address actually) to be transferred is not present, the arithmetic control unit 16 discards the received packet in "S208" in FIG. 4.

Also, at the time of outbound communication (packet reception from the honeynet side), the arithmetic control unit 16 decides whether or not a packet is received from a certain honey pot located at the honeynet side through the communication unit 17 in "S301" in FIG. 9.

For example, it is assumed that a packet as shown by "PC61" in FIG. 10 and whose destination global address is "210.220.230.230" is sent from the honey pot 14 whose private address is "192.168.0.1" to the unauthorized access information collection device 11.

Also, at this time, the unauthorized access information collection device 11 shall transfer a packet to the Internet using "210.220.230.240" among global addresses allocated to a private address of the honey pot 14 as a sending address.

If deciding that the packet is received from the certain honey pot located at the honeynet side through the communication unit 17 in "S301" in FIG. 9, the arithmetic control unit 16 retrieves whether or not limit information about a source private address is registered in a communication control list in "S302" in FIG. 9.

When the arithmetic control unit 16 decides that the limit information about the source private address is not present in the communication control list in "S303" in FIG. 9, the arithmetic control unit 16 records the received packet in the storage unit 18 and also writes a detection point identifier into a payload of the recorded packet in "S304" in FIG. 9.

That is, information as shown in FIG. 11A is written into a packet whose destination global address is "210.220.230.230" and which is received from the honey pot 14 whose private address is "192.168.0.1". Then, through the step "S304" in FIG. 9, the arithmetic control unit 16 writes information as shown in FIG. 11B into the payload portion and records the information in the storage unit 18.

For example, "3" is written into the portion shown by "ID71" in FIG. 11 as a detection point identifier.

Incidentally, the detection point identifier "3" indicates a point when a packet is transferred to the Internet side.

The arithmetic control unit 16 rewrites a source address of the received packet into a global address "210.220.230.240" in "S305" in FIG. 9. Also, the arithmetic control unit 16 transfers the rewritten received packet to a terminal having a destination global address located at the Internet side through the communication unit 15 in "S306" in FIG. 9.

For example, the received packet is rewritten into a global address from a source address as shown by "CA61" in FIG. 10 and is transferred to the terminal 1 as shown by "PC62" in FIG. 10.

On the other hand, in the case of deciding that the limit information is present in the communication control list in "S303" in FIG. 9, in other words, in the case of limiting sending from the source private address, the arithmetic control unit 16 records the received packet in the storage unit 18 and also writes a detection point identifier into a payload of the recorded packet in "S307" in FIG. 9 and the arithmetic control unit 16 discards the received packet in "S308" in FIG. 9.

Figures 12A, 12B:
FIGS. 12A and 12B are explanatory diagrams explaining one example of a recorded packet.

That is, information as shown in FIG. 12A is written into a packet whose destination global address is "210.220.230.230" and which is received from the honey pot 14 whose private address is "192.168.0.1". Then, through step "S307" in FIG. 9, the arithmetic control unit 16 writes information as shown in FIG. 12B into the payload portion and records the information in the storage unit 18.

For example, "4" is written into the portion shown by "ID81" in FIG. 12 as a detection point identifier.

Incidentally, the detection point identifier "4" indicates a point when a packet is discarded without transferring the packet to the Internet side.

With such an action, it is possible to collect unauthorized access information since a packet to which the detection point identifier is added is stored in the storage unit 18.

Also, a private address is allocated to each of the honey pots constructing a honeynet and plural global addresses are allocated to the private address by setting a routing table. Thus, when unauthorized access information about wide address space is collected, it becomes unnecessary to prepare a large number of honey pots (a network device, a server or the like) and the unauthorized access information about wide address space can be collected at low cost.

Also, the unauthorized access information collection device 51 performs communication control of a packet from the honeynet side to the Internet side based on a preset communication control list. Accordingly, for example, it is possible to prevent a honey pot to which unauthorized access is made from being used as the ladder for an attack on other networks.

As a result of this, the unauthorized access information collection device 51 is provided between the Internet and the honeynet, and also a private address is allocated to each of the honey pots constructing the honeynet and plural global addresses are allocated to the private address by setting a routing table. Then, a received packet is transferred and the packet into which a detection point identifier is written is recorded and communication control from the honeynet side to the Internet side is performed based on the set communication control list. Accordingly, it is possible to collect unauthorized access information about wide address space at low cost and, for example, it is possible to prevent the honey pot to which unauthorized access is made from being used as the ladder for an attack on other networks.

A display method of the unauthorized access information recorded thus will be now described further with reference to FIGS. 13, 14, 15 and 16.

Figure 13:
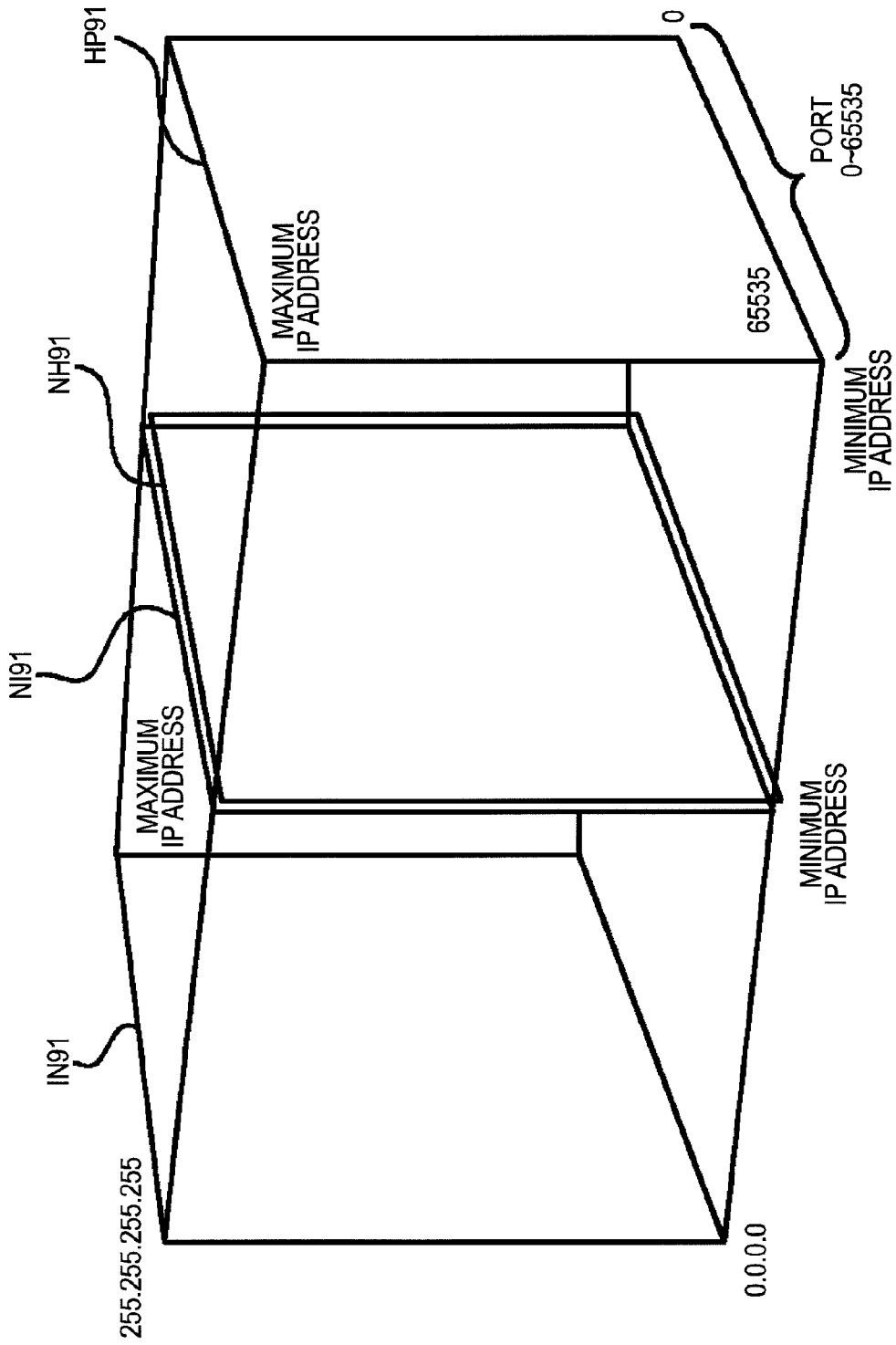
FIG. 13 is an explanatory diagram explaining a configuration of a display screen.
Figure 14:
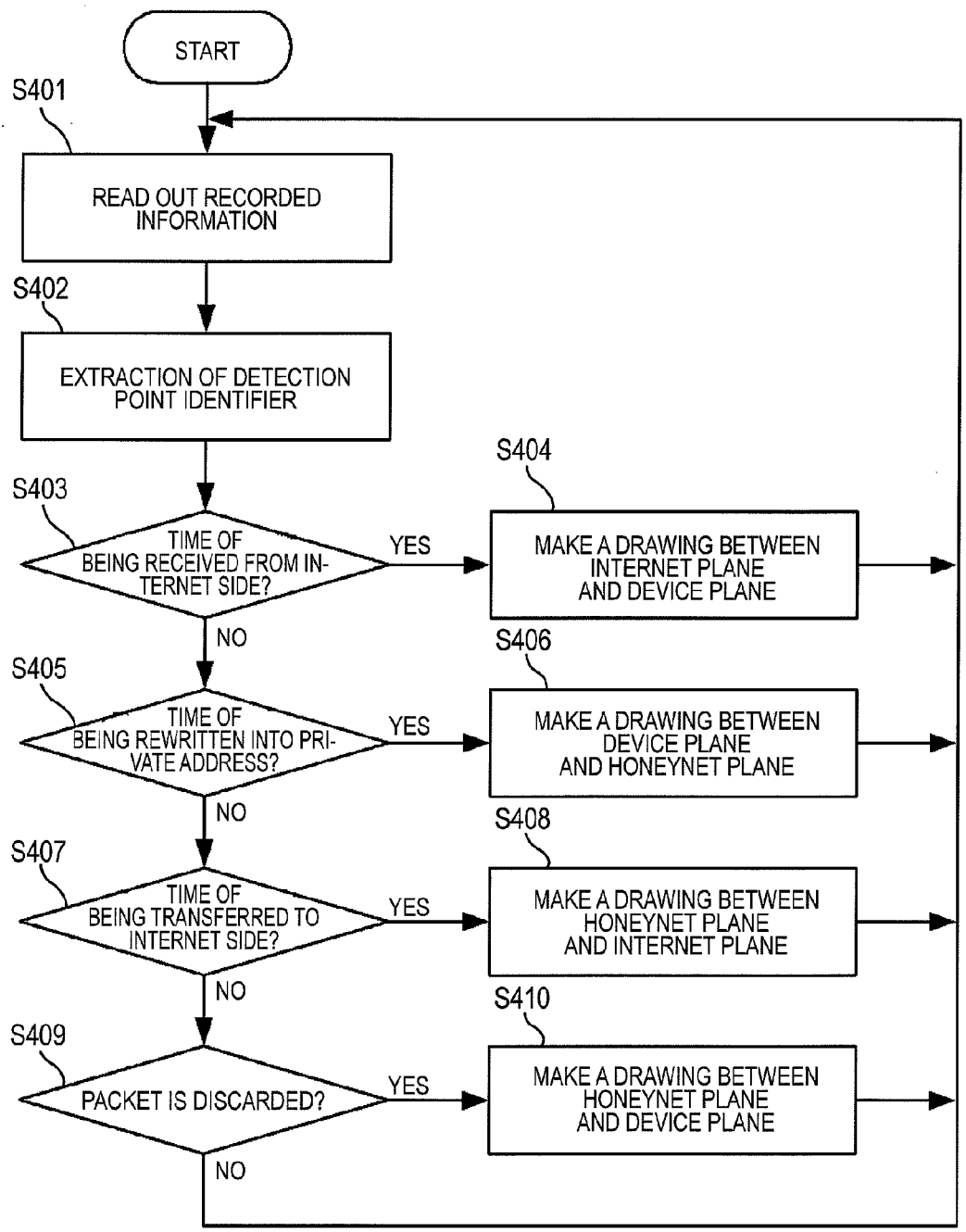
FIG. 14 is a flowchart explaining an action of the arithmetic control unit at the time of displaying unauthorized access information.

FIG. 13 is an explanatory diagram explaining a configuration of a display screen, and FIG. 14 is a flowchart explaining an action of the arithmetic control unit 16 at the time of displaying unauthorized access information. FIGS. 15A to 16C are explanatory diagrams showing a display example of unauthorized access information.

In order to visualize a situation of communication between a terminal located at the Internet side and the unauthorized access information collection device, a situation of communication between the unauthorized access information collection device and a honey pot located at the honeynet side and a situation of communication between the terminal located at the Internet side and the honey pot located at the honeynet side in three dimensions, the arithmetic control unit 16 controls the display unit 19 and sets display coordinates of a configuration as shown in FIG. 13.

In the display coordinates shown in FIG. 13, a plane (hereinafter called an Internet plane) shown by "IN91" in FIG. 13 is a coordinate plane, in which the axis of ordinate is set in an IP address and the axis of abscissa is set in a port number, and planes (hereinafter called an Internet side device plane, a honeynet side device plane and a honeynet plane, respectively) shown by "NI91", "NH91" and "HP91" in FIG. 13 are similarly coordinate planes, in which the axis of ordinate is set in the IP address and the axis of abscissa is set in the port number.

Also, IP address ranges of the respective axes of ordinates are "0.0.0.0" to "255.255.255.255" in the Internet plane shown by "IN91" in FIG. 13 and "the minimum IP address" to "the maximum IP address" of global addresses (global addresses registered in a routing table) are allocated to the unauthorized access information collection device 10 in the Internet side device plane and the honeynet side device plane shown by "NI91" and "NH91" in FIG. 13.

Similarly, the IP address range is "the minimum IP address" to "the maximum IP address" of a private address (private address registered in the routing table) allocated to each honey pot in the honeynet plane shown by "HP91" in FIG. 13.

On the other hand, port number ranges of the respective axes of abscissas are "0" to "65535" in the Internet plane, the Internet side device plane, the honeynet side device plane and the honeynet plane shown by "IN91", "NI9", "NH91" and "HP91" in FIG. 13, respectively.

That is, the arithmetic control unit 16 visualizes a communication situation between the terminal of the Internet side and the unauthorized access information collection device between the Internet plane shown by "IN91" in FIG. 13 and the Internet side device plane shown by "NI91" in FIG. 13 in three dimensions, and visualizes the communication situation between the unauthorized access information collection device and the honey pot of the honeynet side, between the honeynet side device plane shown by "NH91" in FIG. 13 and the honeynet plane shown by "HP91" in FIG. 13 in three dimensions by the following action.

Further, a communication situation between the terminal of the Internet side and the honey pot of the honeynet side is visualized between the Internet plane shown by "IN91" in FIG. 13 and the honeynet plane shown by "HP91" in FIG. 13 in three dimensions.

However, in the following action explanation, the explanation about a port number which is the axis of abscissa will be properly omitted for simplicity of explanation.

The arithmetic control unit 16 reads a packet recorded at the time of the previous inbound communication or the outbound communication out of the storage unit 18 in "S401" in FIG. 14, and the arithmetic control unit 16 extracts a detection point identifier from the packet read out in "S402" in FIG. 14.

For example, a detection point identifier is written into the portion shown by "ID31" in FIG. 6 of a packet stored in the storage unit 18, so that the detection point identifier is extracted from the portion shown by "ID31" in FIG. 6 of the packet read out.

The arithmetic control unit 16 decides whether or not the extracted detection point identifier is "1", in other words, whether or not it is a point when a packet is received from the Internet side in "S403" in FIG. 14. If the detection point identifier is "1", the arithmetic control unit 16 draws between the Internet plane and the Internet side device plane in "S404" in FIG. 14.

If the detection point identifier is "1", the read-out packet is constructed as shown in, for example, FIG. 7B, so that the arithmetic control unit 16 displays a source address shown by "SA41" in FIG. 7 in the coordinates of the Internet plane and displays a destination address shown by "DA41" in FIG. 7 in the coordinates of the Internet side device plane and also draws so as to connect two points with a line segment.

Figure 15A:
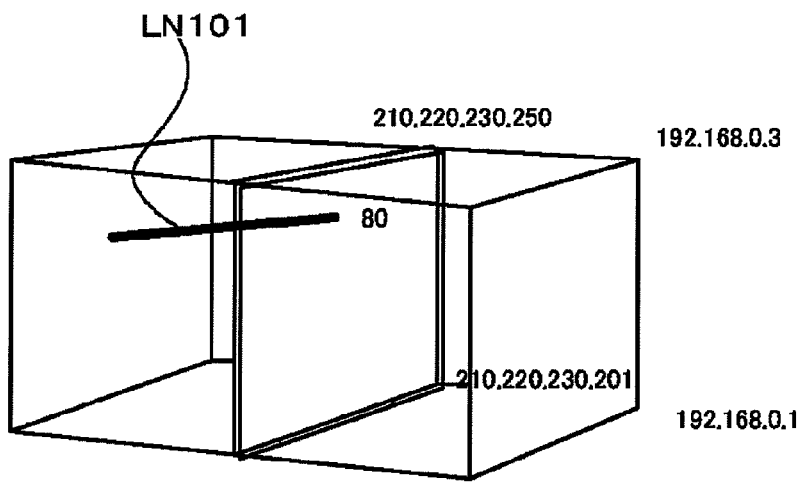
FIGS. 15A to 15C are explanatory diagrams showing a display example of unauthorized access information.

Concretely, when a port number "80" of an IP address "210.220.230.240" is accessed from the Internet side, as shown in FIG. 15A, drawing is made such that the Internet plane is connected to the Internet side device plane with a line segment as shown by "LN101" in FIG. 15.

In the case of deciding that the detection point identifier extracted in "S403" in FIG. 14 is "1", i.e., it is not a point when the packet is received from the Internet side, the arithmetic control unit 16 decides whether or not the extracted detection point identifier is "2", i.e., it is a point when it is rewritten into a private address in "S405" in FIG. 14. If the detection point identifier is "2", the arithmetic control unit 16 make a drawing between the honeynet side device plane and the honeynet plane in "S406" in FIG. 14.

If the detection point identifier is "2", the read-out packet is constructed as shown in, for example, FIG. 8B. Accordingly, the arithmetic control unit 16 displays a destination global address before rewriting shown by "BN51" in FIG. 8B in the coordinates of the honeynet side device plane and displays the rewritten private address shown by "DA51" in FIG. 8 in the coordinates of the honeynet plane and also makes a drawing such that two points are connected to each other with a line segment.

Figure 15B:
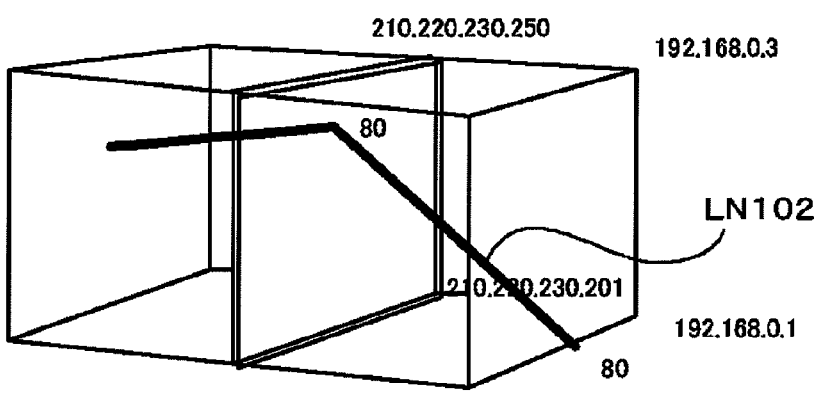

Concretely, when an IP address (global address) "210.220.230.240" is allocated to a private address "192.168.0.1", as shown in FIG. 15B, drawing is made such that the honeynet side device plane is connected to the honeynet plane with a line segment as shown by "LN102" in FIG. 15B. Incidentally, at this time, the Internet side device plane and the honeynet side device plane have the same coordinate position and the Internet side device plane, the honeynet side device plane and the honeynet plane have the same port numbers "80".

In the case of deciding that the detection point identifier extracted in "S405" in FIG. 14 is "2", i.e., it is not a point when it is rewritten into the private address, the arithmetic control unit 16 decides whether or not the extracted detection point identifier is "3", i.e., it is a point when a packet is transferred to the Internet side in "S407" in FIG. 14. If the detection point identifier is "3", the arithmetic control unit 16 make a drawing between the honeynet plane and the Internet plane in "S408" in FIG. 14.

When the detection point identifier is "3", the read-out packet is constructed as shown in, for example, FIG. 11B. Thus, the arithmetic control unit 16 displays a source address shown by "SA71" in FIG. 11 in the coordinates of the honeynet plane and displays a destination address shown by "DA71" in FIG. 11 in the coordinates of the Internet plane and also makes drawing such that two points are connected to each other with a line segment.

Figure 15C:
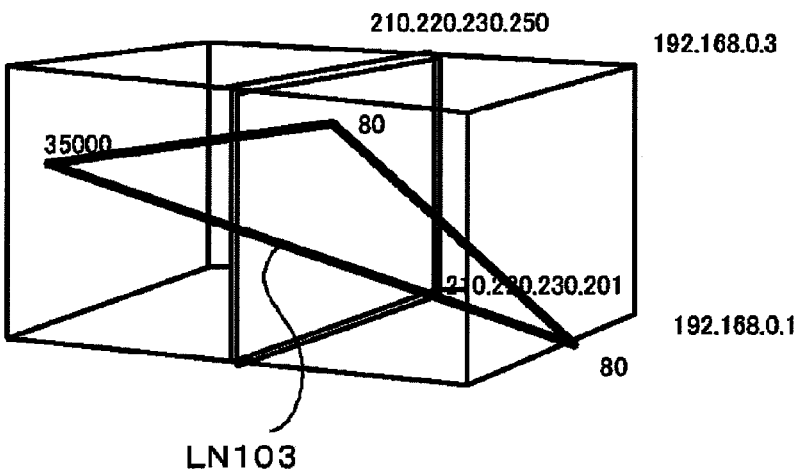

Concretely, when a port number "35000" corresponding to an IP address (global address) "210.220.230.240" is accessed from the honeynet side, as shown in FIG. 15C, drawing is made such that the honeynet plane is connected to the Internet plane with a line segment as shown by "LN103" in FIG. 15.

In the case of deciding that the detection point identifier extracted in "S407" in FIG. 14 is "3", i.e., it is not a point when the packet is transferred to the Internet side, the arithmetic control unit 16 decides whether or not the extracted detection point identifier is "4", i.e., it is a point when a packet is discarded without transferring the packet to the Internet side in "S409" in FIG. 14. If the detection point identifier is "4", the arithmetic control unit 16 makes a drawing between the honeynet plane and the honeynet side device plane in "S410" in FIG. 14.

If the detection point identifier is "4", the read-out packet is constructed as shown in, for example, FIG. 12B. Thus, the arithmetic control unit 16 displays a source address shown by "SA81" in FIG. 12 in the coordinates of the honeynet plane and displays a destination address shown by "DA81" in FIG. 12 in the coordinates of the honeynet side device plane and also make a drawing such that two points are connected to each other with a line segment.

Figure 16A:
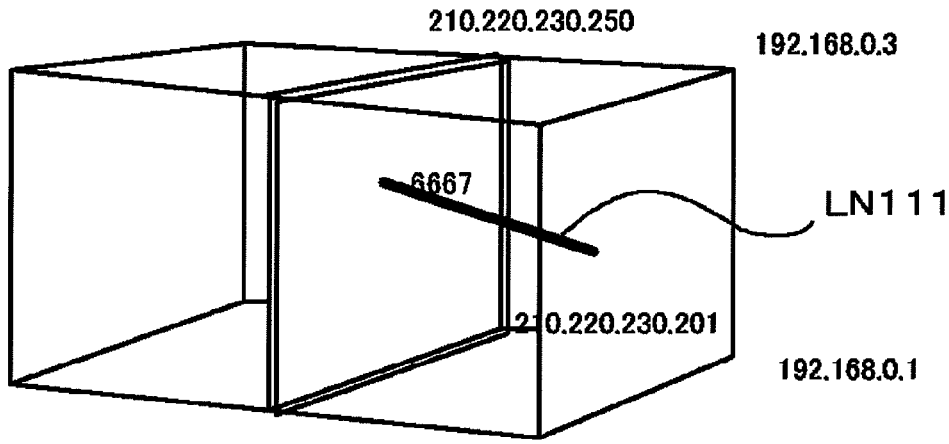
FIGS. 16A to 16C are explanatory diagrams showing a display example of unauthorized access information.

Concretely, when a global address (a port number is "6667") is accessed from a private address "192.168.0.2" in which limit information is set from a honey pot infected with a bot having a private address "192.168.0.2", the packet is discarded by the unauthorized access information collection device. Thus, as shown in FIG. 16A, drawing is made such that the honeynet plane is connected to the honeynet side device plane with a line segment as shown by "LN111" in FIG. 16A.

Finally, in the case of deciding that the detection point identifier extracted in "S409" in FIG. 14 is "4", i.e., it is not a point when the packet is discarded without transferring the packet to the Internet side, the step returns to step "S401" in FIG. 14.

Figure 16B:
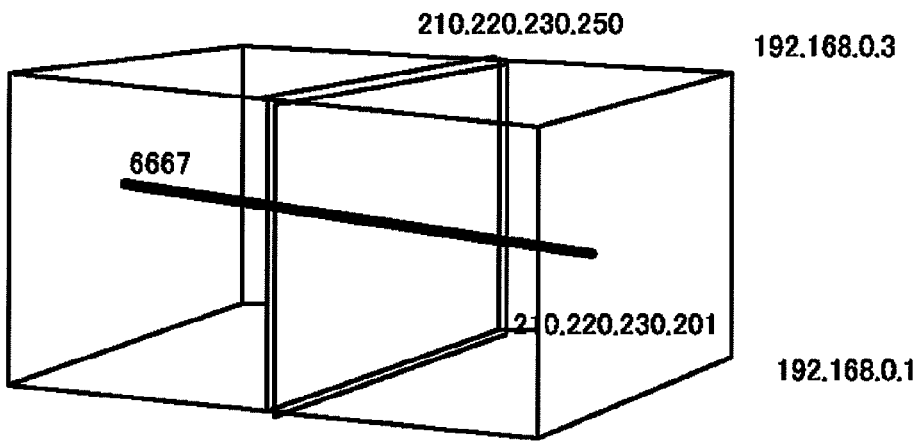
Figure 16C:
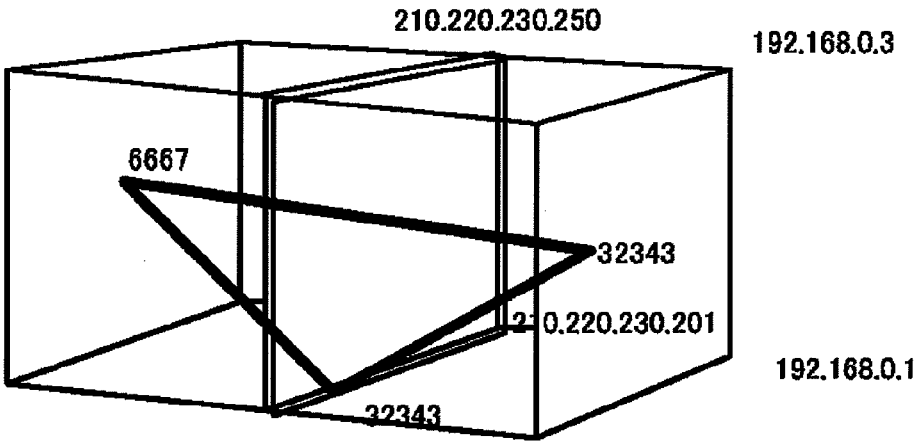
Figure 17:
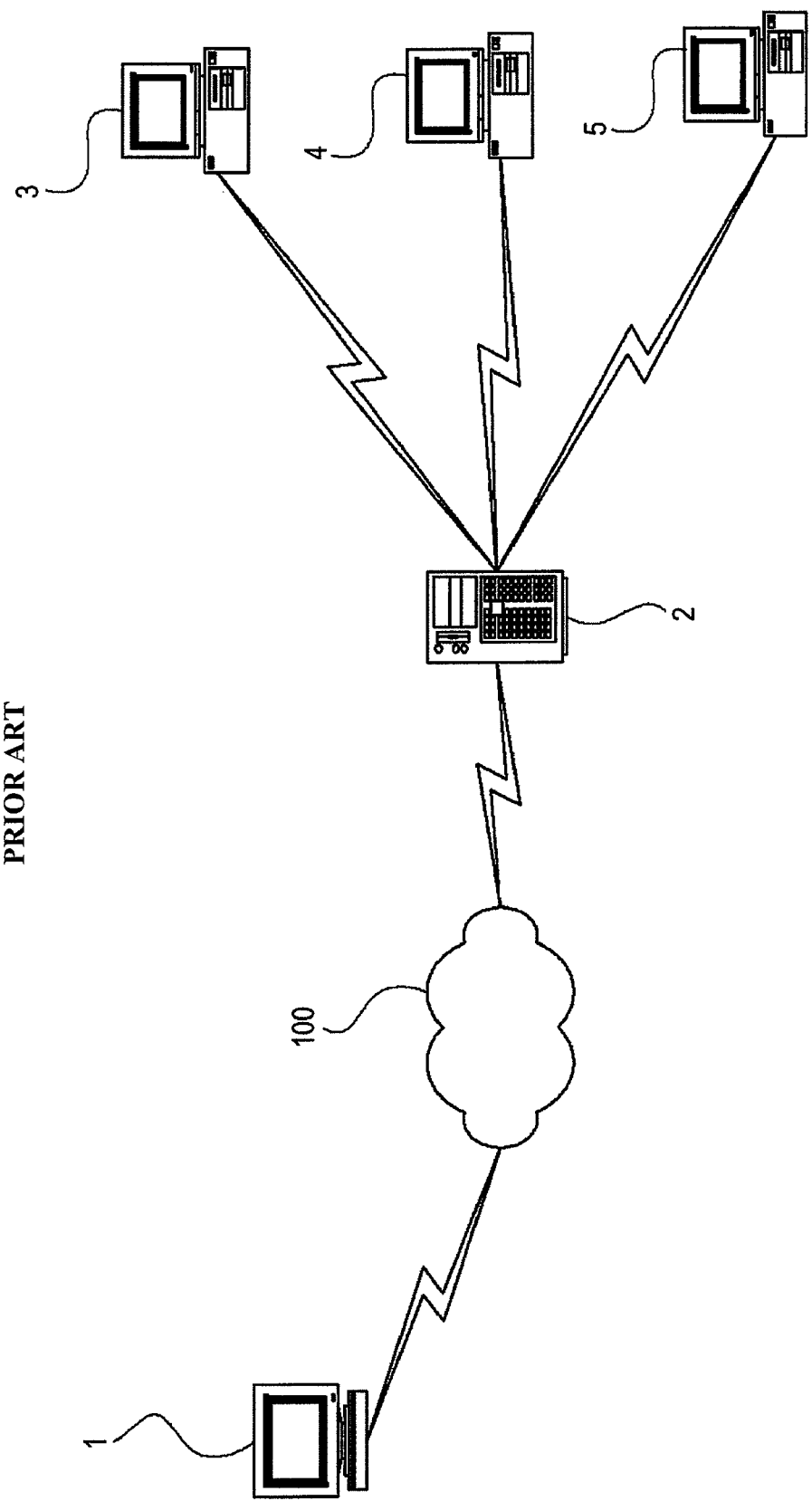
FIG. 17 is a block diagram showing one example of a conventional unauthorized access information collection system.
Figure 18:
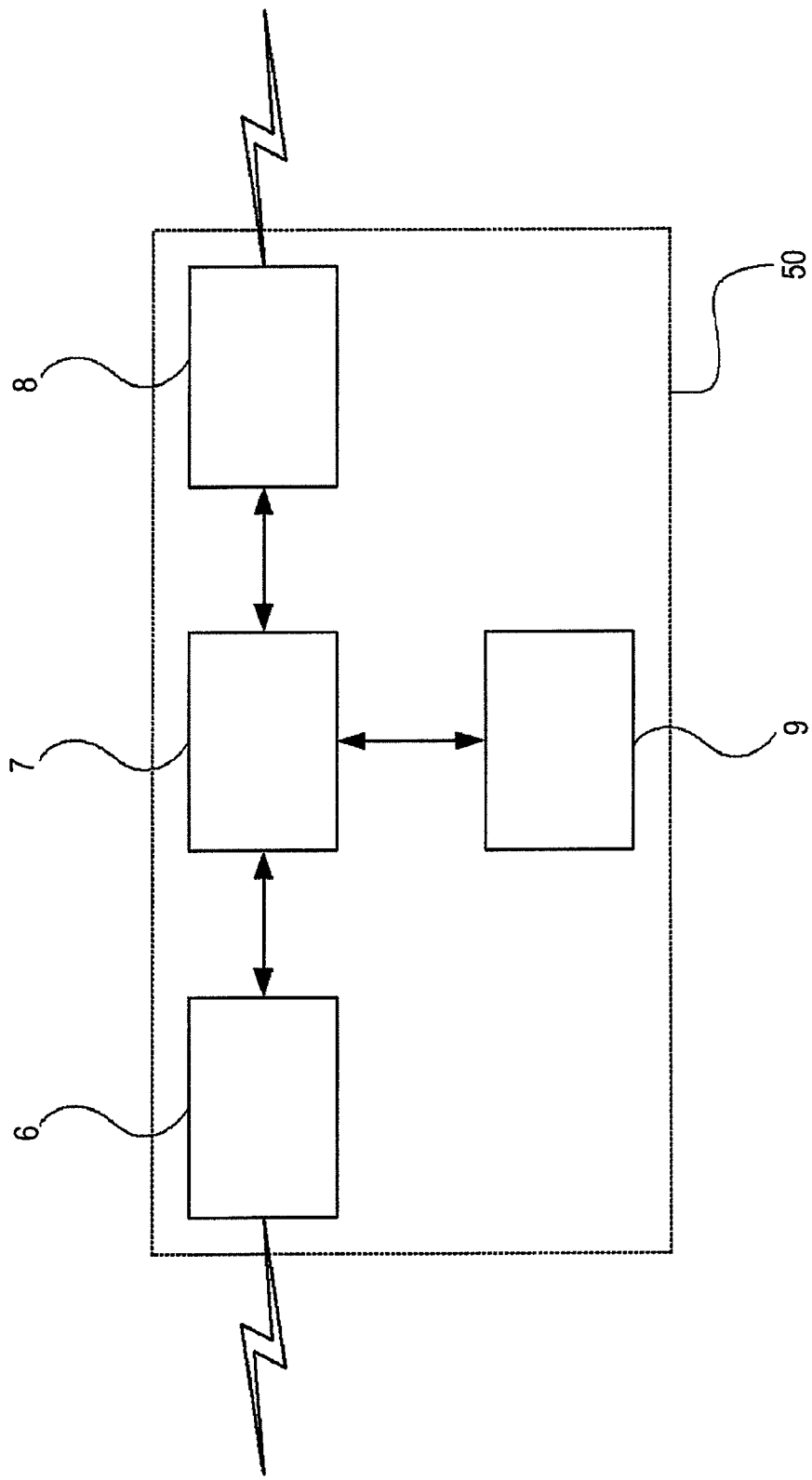
FIG. 18 is a block diagram showing a concrete example of an unauthorized access information collection device.
Figure 19:
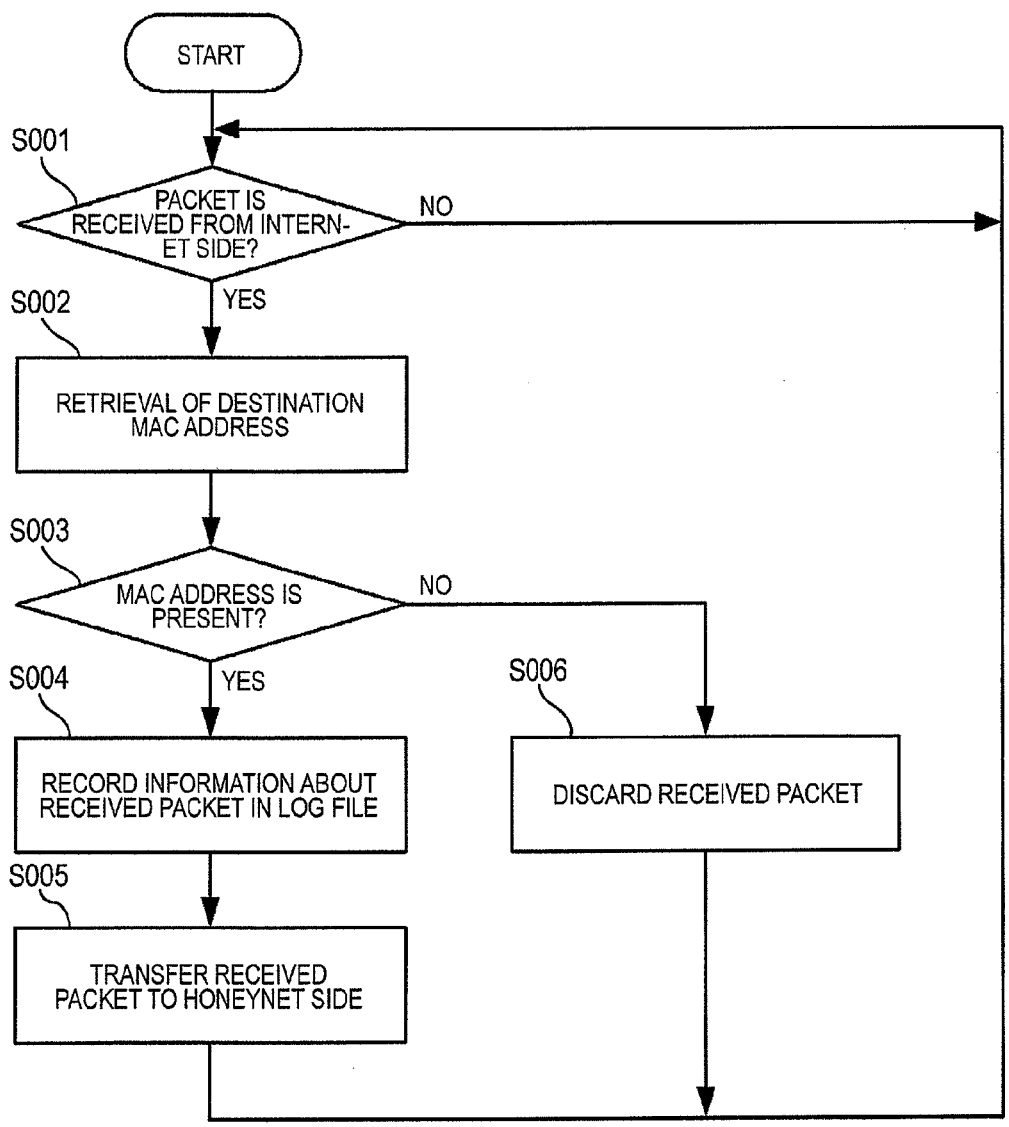
FIG. 19 is a flowchart explaining an action of an arithmetic control unit at the time of inbound communication.
Figure 20:
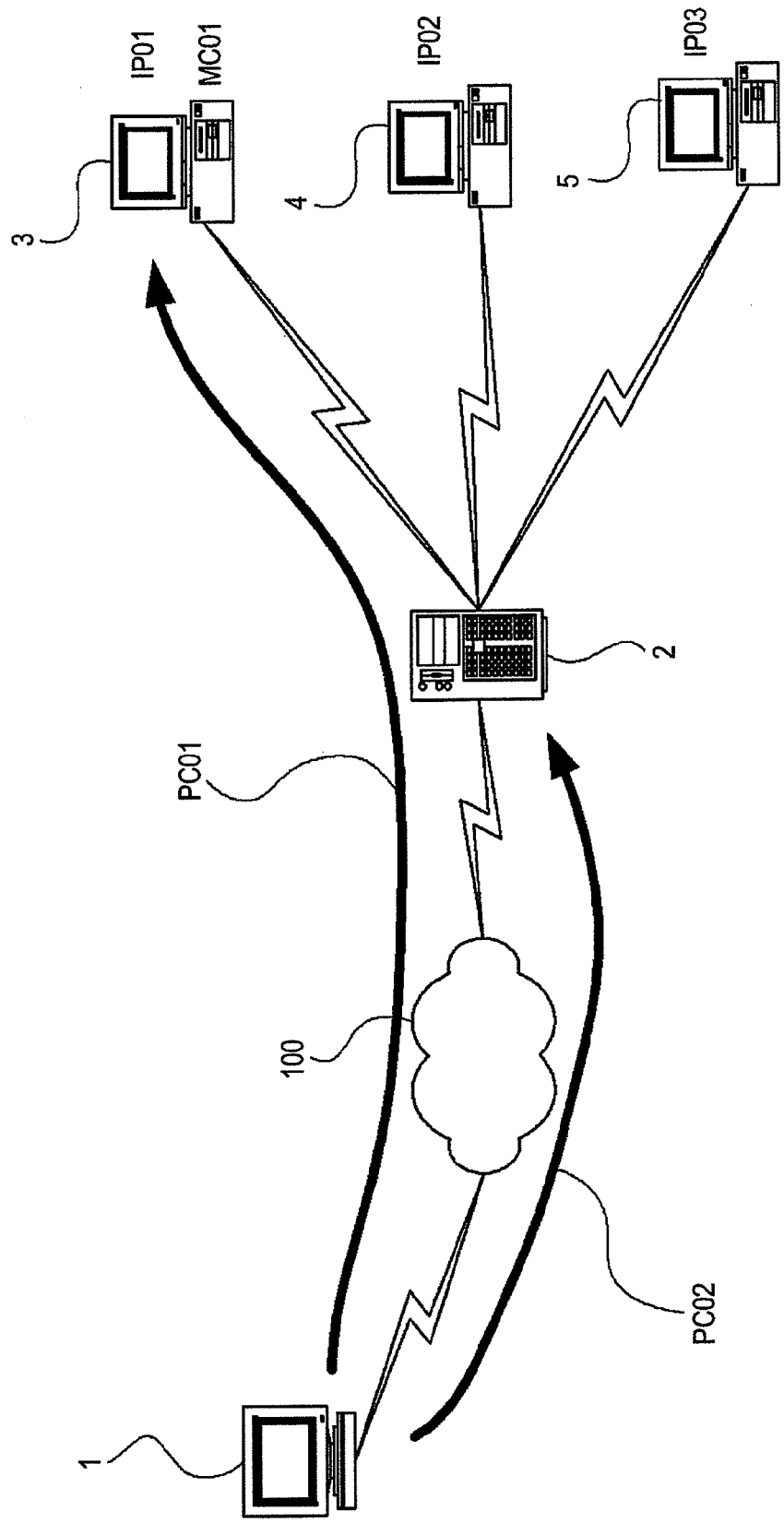
FIG. 20 is an explanatory diagram explaining an action at the time of inbound communication.
Figure 21:
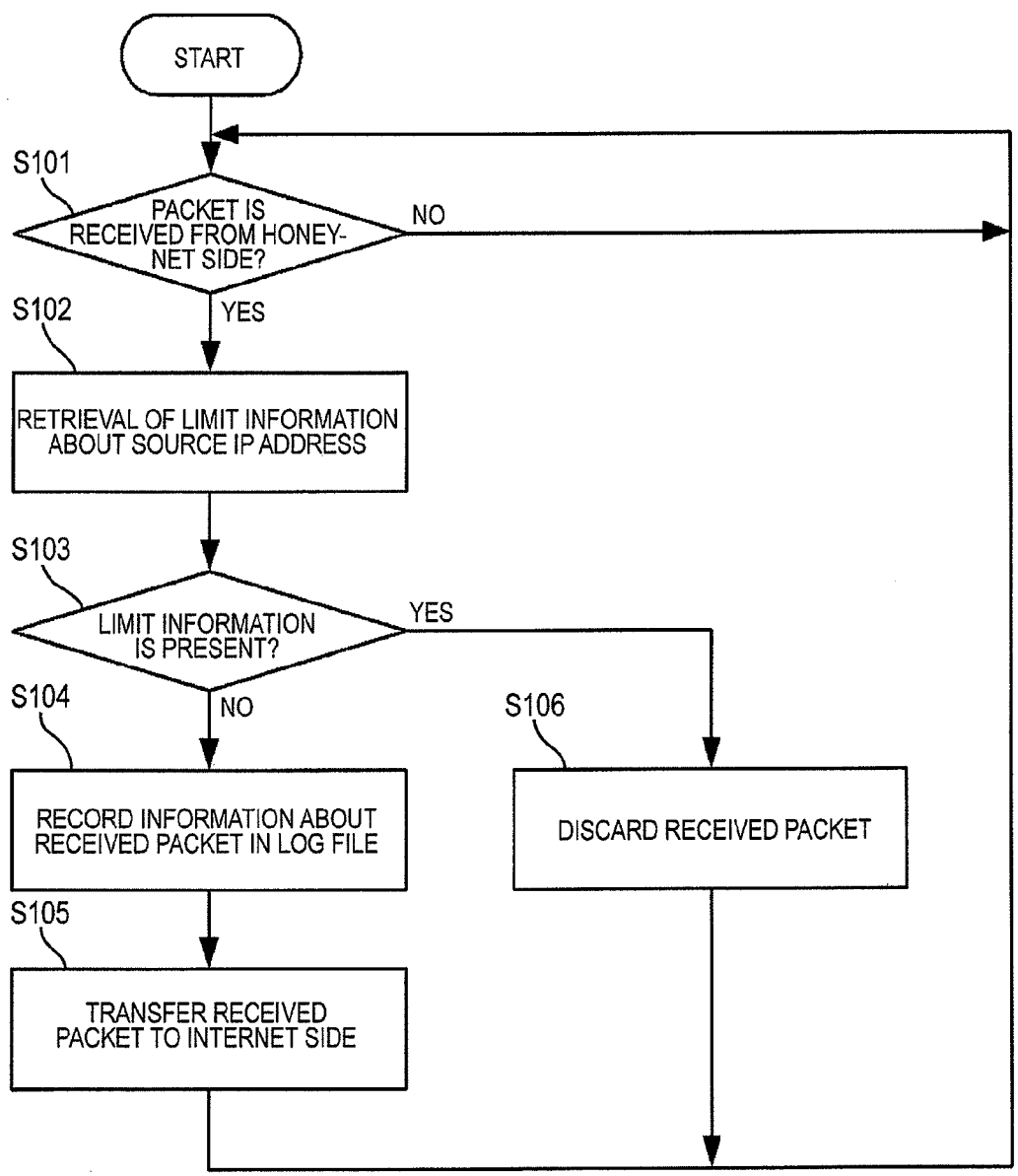
FIG. 21 is a flowchart explaining an action of the arithmetic control unit at the time of outbound communication.
Figure 22:
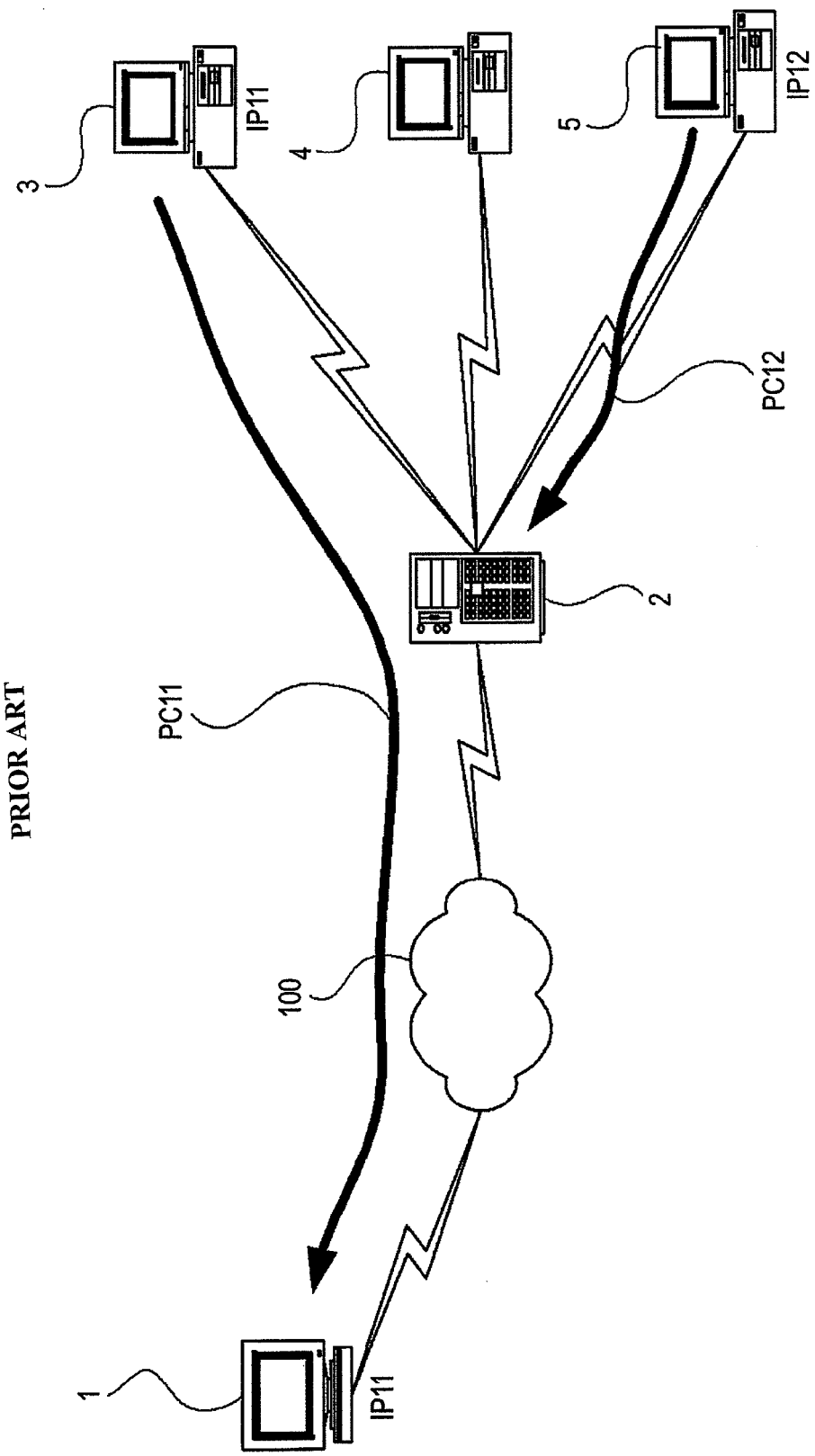
FIG. 22 is an explanatory diagram explaining an action at the time of outbound communication.

Incidentally, FIG. 16B shows a situation in which access to a global address (a port number is "6667") from a private address "192.168.0.2" in which limit information is set from a honey pot infected with a bot having a private address "192.168.0.2" is permitted only one time. FIG. 16C shows a communication situation between the global address (the port number is "6667") and the private address "192.168.0.2" in which limit information is set thereafter.

As a result of this, based on the recorded packet to which the detection point identifier is added, the arithmetic control unit makes a drawing between the Internet plane and the Internet side device plane with the line segment, makes a drawing between the honeynet side device plane and the honeynet plane with the line segment or makes a drawing between the Internet plane and the honeynet plane with the line segment. Accordingly, a communication situation between the respective devices can be displayed in three dimensions, so that an operating analysis can be easily performed.

In addition, in the description of the embodiment shown in FIG. 1, the unauthorized access information collection device 10 displays a communication situation between the respective devices in three dimensions based on a recorded packet, but the management terminal 14 connected to the Internet 100 may acquire the recorded packet from the unauthorized access information collection device 10 and display a communication situation between the respective devices in three dimensions on display unit of the management terminal 14.

In this case, since drawing processing is performed by the management terminal 14, it is possible to reduce a load of drawing processing of the unauthorized access information collection device 10.

Also, in the description of the embodiment shown in FIG. 1, plural global addresses are respectively allocated to plural private addresses in a routing table, but plural global addresses may be allocated to one private address and also the global addresses are freely allocated to the private addresses.

Also, in the description of the embodiment shown in FIG. 1, particularly, in case where a communication situation between the respective devices is displayed in three dimensions, a display plane of the unauthorized access information collection device is divided into two planes of an Internet side device plane and a honeynet side device plane and, but the Internet side device plane and the honeynet side device plane have the same coordinate position as described above, so that the display plane may be displayed by one device plane.

Also, in the description of the embodiment shown in FIG. 1, particularly, in case where a communication situation between the respective devices is displayed in three dimensions, line segments connecting the respective planes may be classified by a TCP (Transmission Control Protocol) flag, a packet protocol type, for example, can be displayed with color coding.

In this case, the protocol type of the packet passing through the respective devices can intuitively be separated and observed by color, so that operating analysis can be performed more easily.

Also, in the description of the embodiment shown in FIG. 1, particularly, in case where a communication situation between the respective devices is displayed in three dimensions, drawing is made such that the respective planes are simply connected with a line segment, but a marker may be moved toward a packet propagation direction so as to trace the line segment.

Incidentally, as the marker, all shapes may be used as long as it is any shape such as any diagram or a line segment thicker and shorter than the line segment. Further, visibility can be improved by making luminance of the marker higher than ambient luminance (concretely, setting the luminance of the marker to be different from the ambient luminance).

In this case, since the marker moves toward a packet propagation direction so as to trace the line segment, the packet propagation direction can be grasped intuitively.

Also, in the description of the embodiment shown in FIG. 1, particularly, in case where a communication situation between the respective devices is displayed in three dimensions, the axis of ordinate of a coordinate plane such as the Internet plane is set as an IP address and the axis of abscissa is set as a port number in display coordinates, but the reverse case may naturally be adopted.

Also, in the description of the embodiment shown in FIG. 1, particularly, in case where a communication situation between the respective devices is displayed in three dimensions, after drawing a line segment etc., the drawing of the line segment may be erased after a lapse of a certain time.

In this case, it is possible to intuitively grasp the behavior of a packet varying constantly.

Also, in the description of FIG. 3, a private address is allocated to the respective honey pots using a routing table, but a global address may naturally be allocated to each of the honey pots.

Also, a routing table of the unauthorized access information collection device may be dynamically changed by a management terminal connected to the Internet. Further, a communication limit list of the unauthorized access information collection device may be dynamically changed by the management terminal connected to the Internet.

Also, as information stored in the routing table, an IP including a port number or a communication protocol as well as an IP address may be allocated to the respective honey pots.

Also, in the description of the embodiment shown in FIG. 1, a global address is allocated to the unauthorized access information collection device, but a private address may naturally be allocated.

Also, in the case of explanation of the embodiment shown in FIG. 1, at the time of communication (packet reception from the honeynet side), communication control depends on whether or not limit information about a source private address is registered in a communication control list, but communication control may be performed based on a source port number and a source private address.

Also, in the description of the embodiment shown in FIG. 1, particularly, in case where a communication situation between the respective devices is displayed in three dimensions, the axis to which a port number is allocated may be displayed by the logarithmic axis. In this case, it becomes easy to recognize access to well-known port numbers (0 to 1023).

Also, in the description of the embodiment shown in FIG. 1, particularly, in case where a communication situation between the respective devices is displayed in three dimensions, endian conversion may be made in byte order of a destination IP address.

For example, when a destination IP address is "210.220.230.240", the destination IP address is converted into "240.230.220.210".

In this case, when a honey pot continuously scans an IP address, line segments are separately displayed without overlapping mutually, and thus the visibility can be improved.

The present application is based on Japanese patent application No. 2007-004038, filed on Jan. 12, 2007, and the contents of which are hereby incorporated by reference.

The invention claimed is:

1. An unauthorized access information collection system for monitoring unauthorized access to a honeynet so as to collect unauthorized access information, the system comprising:

a honeynet comprising a plurality of honey pots, each honey pot being allocated an internet protocol (IP) address; and an unauthorized access information collection device which is disposed between an Internet and the honeynet and which allocates a plurality of global addresses to each of the IP addresses and generates a routing table comprising the IP addresses and their respective corresponding global addresses, wherein the unauthorized access information collection device uses the routing table to transfer packets received from the Internet to the honeynet, and transfers received packets from the honeynet to the Internet according to a communication control list, and the unauthorized access information collection device records packets that pass through the unauthorized access information collection device from the Internet to the honeynet and vice versa, and wherein the unauthorized access information collection device comprises:

a first communication unit that conducts communication with the Internet;

a second communication unit that conducts communication with the honeynet;

a storage unit which stores the routing table; and an arithmetic control unit which controls the unauthorized access information collection device and which:

records a packet received through the first communication unit in the storage unit;

writes a first detection point identifier, a destination global address of the received packet, and a destination port number of the received packet into a payload of the recorded packet;

if the destination global address of the received packet is present in the routing table, records a new packet in the storage unit, the new packet having an IP address from the routing table that corresponds to the destination global address of the received packet as a destination address and writes a second detection point identifier, the destination global address of the received packet and the destination port number of the received packet into a payload of the new recorded packet, and transfers the new recorded packet through the second communication unit to the honeynet, wherein the first detection point identifier indicates a point of receipt of a packet from the Internet and the second detection point identifier indicates a point of rewriting into a private address; and if the destination global address of the received packet is not present in the routing table, discards the received packet.

2. The unauthorized access information collection system as claimed in claim 1, wherein the arithmetic control unit which further controls the unauthorized access information collection device to:

if limit information about a source IP address of a packet received from the honeynet through the second communication unit is not registered in the communication control list, records the received packet in the storage unit and writes a third detection point identifier into a payload of the recorded packet and writes a source global address from the routing table that corresponds to the source IP address of the received packet as a source address of the recorded packet, and transfers the recorded packet through the first communication unit; and if the limit information is present in the communication control list, records the received packet in the storage unit, writes a fourth detection point identifier into a payload of the recorded packet, and discards the received packet.

3. The unauthorized access information collection system as claimed in claim 2, wherein the unauthorized access information collection device further comprises a display unit, and wherein the arithmetic control unit:

displays, on the display unit, an Internet plane, an device plane and a honeynet plane which use an IP address and a port number, respectively, as coordinate axes;

reads a recorded packet from the storage unit;

if the recorded packet includes the first detection point identifier, draws a line between the Internet plane and the device plane using the information recorded in the recorded packet;

if the recorded packet includes the second detection point identifier, draws a line between the device plane and the honeynet plane using the information recorded the recorded packet;

if the recorded packet includes the third detection point identifier, draws a line between the honeynet plane and the Internet plane using the information recorded in the recorded packet; and if the recorded packet includes the fourth detection point identifier, draws a line between the honeynet plane and the device plane using the information recorded in the recorded packet.

4. The unauthorized access information collection system as claimed in claim 3, wherein when the recorded packet includes the first detection point identifier, the arithmetic control unit displays the source address of the recorded packet as a point in coordinates of the Internet plane and displays the destination address of the recorded packet as a point in coordinates of the device plane and draws the line such that the two points are connected to each other with a line segment.

5. The unauthorized access information collection system as claimed in claim 3, wherein when the recorded packet includes the second detection point identifier, the arithmetic control unit displays the destination global address from the payload of the recorded packet as a point in coordinates of the device plane and displays the destination IP address of the recorded packet as a point in coordinates of the honeynet plane and draws the line such that the two points are connected to each other with a line segment.

6. The unauthorized access information collection system as claimed in claim 3, wherein when the recorded packet includes the third detection point identifier, the arithmetic control unit displays the source address of the recorded packet as a point in coordinates of the honeynet plane and displays the destination address of the recorded packet as a point in coordinates of the Internet plane and draws the line such that the two points are connected to each other with a line segment.

7. The unauthorized access information collection system as claimed in claim 3, wherein when the recorded packet includes the fourth detection point identifier, the arithmetic control unit displays the source address of the recorded packet as a point in coordinates of the honeynet plane and displays the destination address of the recorded packet as a point in coordinates of the device plane and draws the line such that the two points are connected to each other with a line segment.

8. The unauthorized access information collection system as claimed in any one of claims 4 to 7, wherein the arithmetic control unit displays the line segment using a color coding display.

9. The unauthorized access information collection system as claimed in any one of claims 4 to 7, wherein the arithmetic control unit displays a marker which moves in a packet propagation direction and traces the line segment.

10. The unauthorized access information collection system as claimed in any one of claims 4 to 7, wherein the arithmetic control unit sets luminance of the marker such that luminance of the marker is different from ambient luminance.

11. An unauthorized access information collection system for monitoring unauthorized access to a honeynet so as to collect unauthorized access information, the system comprising:
- a honeynet comprising a plurality of honey pots, each honey pot being allocated an internet protocol (IP) address; and
- an unauthorized access information collection device which is disposed between an Internet and the honeynet and which allocates a plurality of global addresses to each of the IP addresses and generates a routing table comprising the IP addresses and their respective corresponding global addresses,
- wherein the unauthorized access information collection device uses the routing table to transfer packets received from the Internet to the honeynet, and transfers received packets from the honeynet to the Internet according to a communication control list, and
- the unauthorized access information collection device records packets that pass through the unauthorized access information collection device from the Internet to the honeynet and vice versa, wherein the unauthorized access information collection device comprises:
- a first communication unit that conducts communication with the Internet;
- a second communication unit that conducts communication with the honeynet;
- a storage unit which stores the communication control list; and
- an arithmetic control unit which controls the unauthorized access information collection device and which:
  - records a packet received through the first communication unit in the storage unit;
  - writes a first detection point identifier, a destination global address of the received packet, and a destination port number of the received packet into a payload of the recorded packet;
  - if the destination global address of the received packet is present in the routing table, records a new packet in the storage unit, the new packet having an IP address from the routing table that corresponds to the destination global address of the received packet as a destination address and writes a second detection point identifier, the destination global address of the received packet and the destination port number of the received packet into a payload of the new recorded packet, and transfers the new recorded packet through the second communication unit to the honeynet,
- if limit information about a source IP address of a packet received from the honeynet through the second communication unit is not registered in the communication control list, records the received packet in the storage unit and writes a third detection point identifier into a payload of the recorded packet and writes a source global address from the routing table that corresponds to the source IP address of the received packet as a source address of the recorded packet, and transfers the recorded packet through the first communication unit,
- wherein the first detection point identifier indicates a point of receipt of a packet from the Internet and the second detection point identifier indicates a point of rewriting into a private address; and
- if the limit information is present in the communication control list, records the received packet in the storage unit, writes a fourth detection point identifier into a payload of the recorded packet, and discards the received packet.

* * * * *